US012159737B2

(12) United States Patent
Satou et al.

(10) Patent No.: US 12,159,737 B2
(45) Date of Patent: Dec. 3, 2024

(54) INDUCTOR

(71) Applicant: Murata Manufacturing Co., Ltd., Kyoto-fu (JP)

(72) Inventors: Yoshiharu Satou, Nagaokakyo (JP); Sumie Arai, Nagaokakyo (JP); Takuya Ishida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 499 days.

(21) Appl. No.: 17/544,550

(22) Filed: Dec. 7, 2021

(65) Prior Publication Data

US 2022/0165474 A1 May 26, 2022

Related U.S. Application Data

(63) Continuation of application No. PCT/JP2020/022338, filed on Jun. 5, 2020.

(30) Foreign Application Priority Data

Jun. 28, 2019 (JP) ................................ 2019-121688

(51) Int. Cl.
*H01F 27/28* (2006.01)
*H01F 1/20* (2006.01)
(Continued)

(52) U.S. Cl.
CPC ............. *H01F 27/255* (2013.01); *H01F 1/20* (2013.01); *H01F 27/28* (2013.01); *H01F 41/0246* (2013.01)

(58) Field of Classification Search
CPC .......... H01F 27/255; H01F 1/20; H01F 27/28; H01F 41/0246; H01F 17/045;
(Continued)

(56) References Cited

U.S. PATENT DOCUMENTS

2015/0028983 A1* 1/2015 Ryu .................... H01F 1/15308 29/846
2016/0314889 A1* 10/2016 Ryu .................... H01F 41/0246
(Continued)

FOREIGN PATENT DOCUMENTS

JP 2007-165779 A 6/2007
JP 2015-26812 A 2/2015
(Continued)

OTHER PUBLICATIONS

International Search Report issued in PCT/JP2020/022338; mailed Jul. 14, 2020.
(Continued)

*Primary Examiner* — Shawki S Ismail
*Assistant Examiner* — Kazi S Hossain
(74) *Attorney, Agent, or Firm* — Studebaker & Brackett PC

(57) ABSTRACT

An inductor is provided so that reduction in DC superposition characteristics can be suppressed even when a filling rate of a magnetic powder is increased. The inductor includes a coil including a winding portion and a pair of extended portions extended from the winding portion, and a body having the coil embedded therein and containing a magnetic powder containing a first magnetic powder and a second magnetic powder, in which an average particle diameter of the first magnetic powder is larger than an average particle diameter of the second magnetic powder. In a cross section of the body including a winding axis of the winding portion and extending in a long side direction of the body, Voronoi partition is performed with a center of gravity of each magnetic powder as a generating point. When a standard deviation of an area of a Voronoi partition region with a magnetic powder having a particle diameter of equal
(Continued)

to or more than 6 μm as a generating point is calculated, the standard deviation is equal to or less than 300.

20 Claims, 11 Drawing Sheets

(51) Int. Cl.
*H01F 27/255* (2006.01)
*H01F 41/02* (2006.01)

(58) Field of Classification Search
CPC ............... H01F 27/292; H01F 27/2852; H01F 2017/048; H01F 3/10
USPC ........................................... 336/83, 200, 232
See application file for complete search history.

(56) References Cited

U.S. PATENT DOCUMENTS

| | | | | |
|---|---|---|---|---|
| 2018/0308613 | A1* | 10/2018 | Ishida | H01F 27/2852 |
| 2018/0308631 | A1* | 10/2018 | Shinohara | H01F 27/2823 |
| 2020/0152367 | A1* | 5/2020 | Sato | H01F 27/2828 |

FOREIGN PATENT DOCUMENTS

| | | | |
|---|---|---|---|
| JP | 2016-15357 | A | 1/2016 |
| JP | 2018-182204 | A | 11/2018 |
| WO | 2016/185940 | A1 | 11/2016 |

OTHER PUBLICATIONS

Written Opinion of the International Searching Authority issued in PCT/JP2020/022338; mailed Jul. 14, 2020.

* cited by examiner

INDUCTOR

CROSS-REFERENCE TO RELATED APPLICATIONS

This application claims benefit of priority to International Patent Application No. PCT/JP2020/022338, filed Jun. 5, 2020, and to Japanese Patent Application No. 2019-121688, filed Jun. 28, 2019, the entire contents of each are incorporated herein by reference.

BACKGROUND

Technical Field:

The present disclosure relates to an inductor.

Background Art:

Inductors used in electronic devices, particularly inductors for power supplies, are required to be reduced in size and have high performance (high inductance value, high DC superposition characteristics, etc.). As one of such inductors, there is an inductor including a coil embedded in a body and an external terminal connected to the coil and exposed from the body (for example, Japanese Unexamined Patent Application Publication No. 2007-165779).

In order to improve the performance of the inductor described in Japanese Unexamined Patent Application Publication No. 2007-165779, it is conceivable to increase a filling rate of a magnetic powder contained in the inductor. However, when the filling rate of the magnetic powder is increased, there is a problem in that magnetic saturation is likely to occur and the DC superposition characteristics deteriorate.

SUMMARY

Accordingly, the present disclosure provides an inductor capable of suppressing deterioration of DC superposition characteristics even when a filling rate of magnetic powder is increased.

An inductor according to an aspect of the present disclosure is characterized to include a coil including a winding portion and a pair of extended portions extended from the winding portion, and a body having the coil embedded therein and containing a magnetic powder containing a first magnetic powder and a second magnetic powder, in which an average particle diameter of the first magnetic powder is larger than an average particle diameter of the second magnetic powder, and in a cross section of the body including a winding axis of the winding portion and extending in a long side direction of the body, Voronoi partition is performed with the center of gravity of each magnetic powder as a generating point, and when a standard deviation of an area of a Voronoi partition region with a magnetic powder having a particle diameter of equal to or more than 6 μm as a generating point is calculated, the standard deviation is equal to or less than 300.

Also, the present disclosure provides an inductor capable of suppressing deterioration of DC superposition characteristics even when a filling rate of magnetic powder is increased.

DETAILED DESCRIPTION

Figure 1:
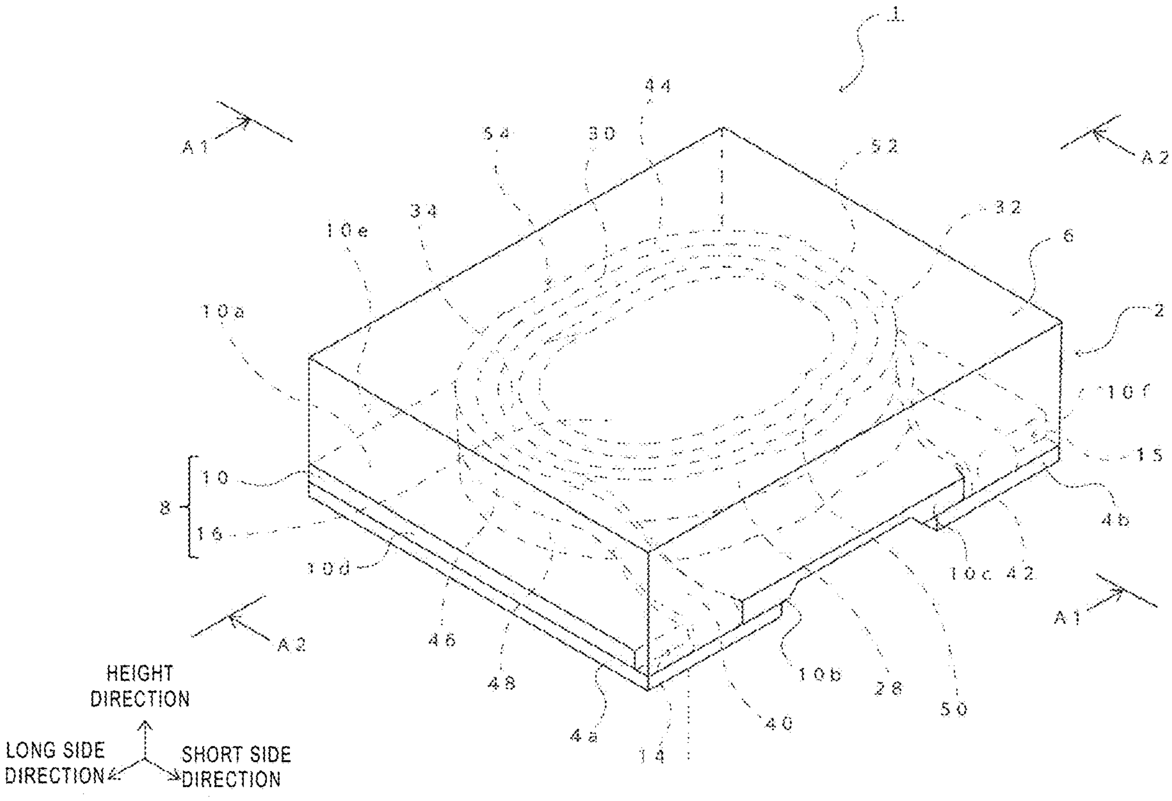
FIG. 1 is a top perspective view illustrating an inductor according to Embodiment 1 of the present disclosure.

Hereinafter, an embodiment and examples for carrying out the present disclosure will be described with reference to the drawings. It should be noted that the inductor described below is for embodying the technical idea of the present disclosure, and the present disclosure is not limited to the following unless otherwise specified.

In the drawings, members having the same function may be denoted by the same reference numerals. In consideration of the description of the main points or the ease of understanding, the embodiment and examples may be separately described for the sake of convenience, but partial replacement or combination of configurations described in different embodiments and examples is possible. In the following embodiment and examples, descriptions of matters common to those described above will be omitted, and only different points will be described. In particular, the same operation and effect by the same configuration will not be sequentially described for each embodiment or example. The sizes, positional relationships, and the like of members illustrated in the drawings may be exaggerated for clarifying the description. In addition, in the following description, terms indicating a specific direction or position (for example, “upper”, “lower”, “right”, “left”, and other terms including these terms) are used as necessary. The use of these terms is for facilitating the understanding of the disclosure with reference to the drawings, and the technical scope of the present disclosure is not limited by the meanings of these terms.

Embodiment 1

Figure 2:
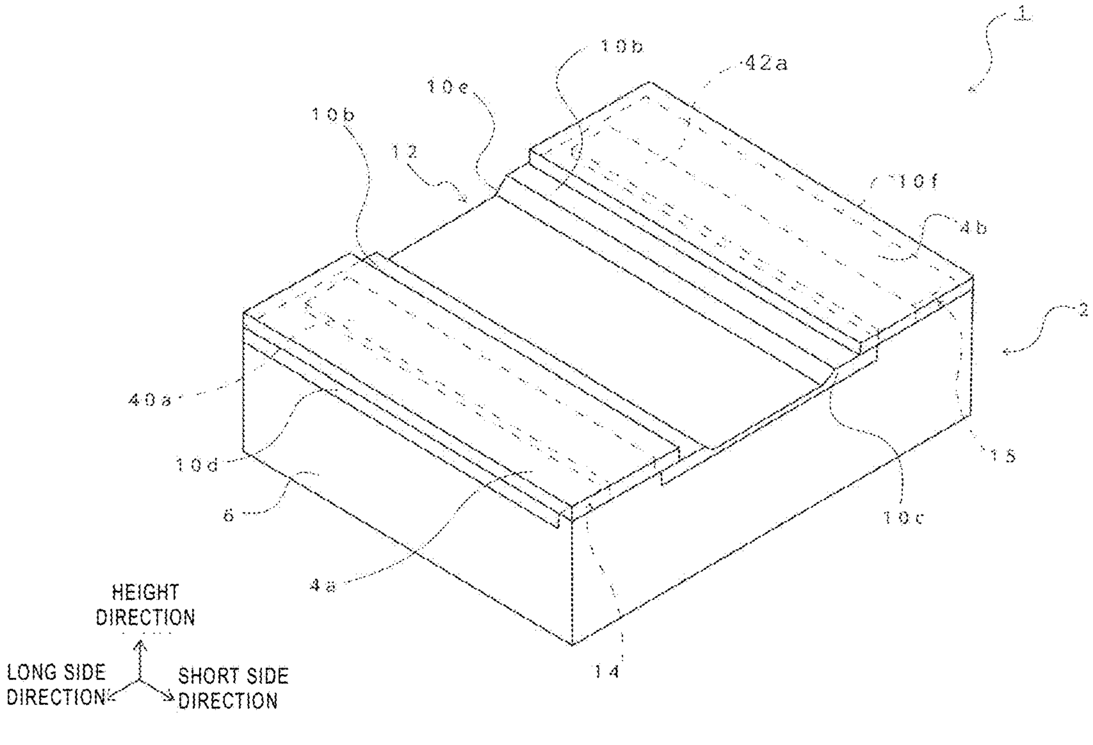
FIG. 2 is a bottom perspective view illustrating the inductor according to Embodiment 1 of the present disclosure.
Figure 3:
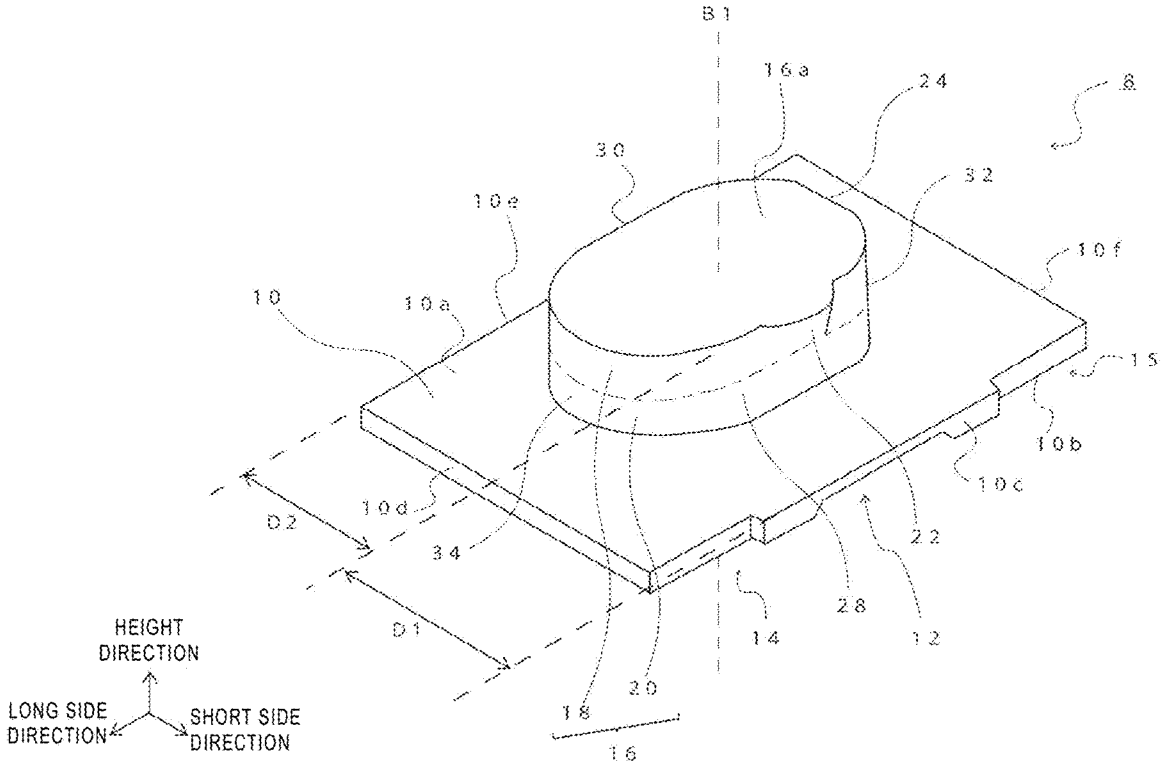
FIG. 3 is a perspective view illustrating only a magnetic base of the inductor of FIG. 1.
Figure 4:
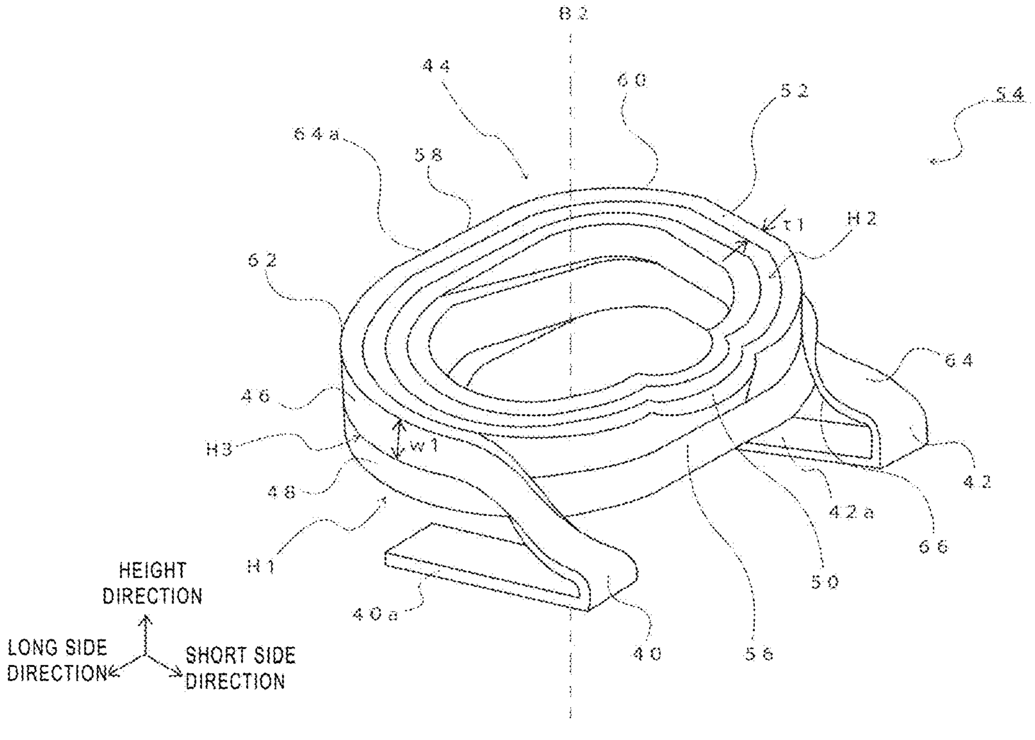
FIG. 4 is a perspective view illustrating only a coil of the inductor of FIG. 1.
Figure 5:
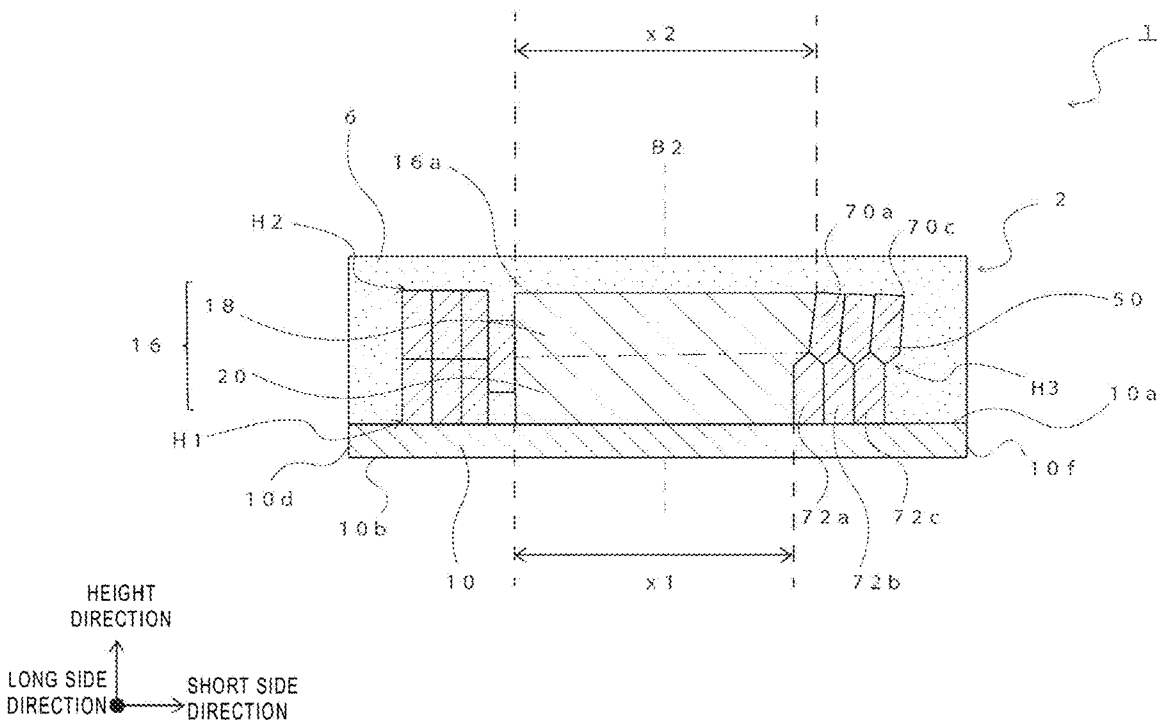
FIG. 5 is a cross-sectional view taken along a line A1-A1 of FIG. 1.
Figure 6:
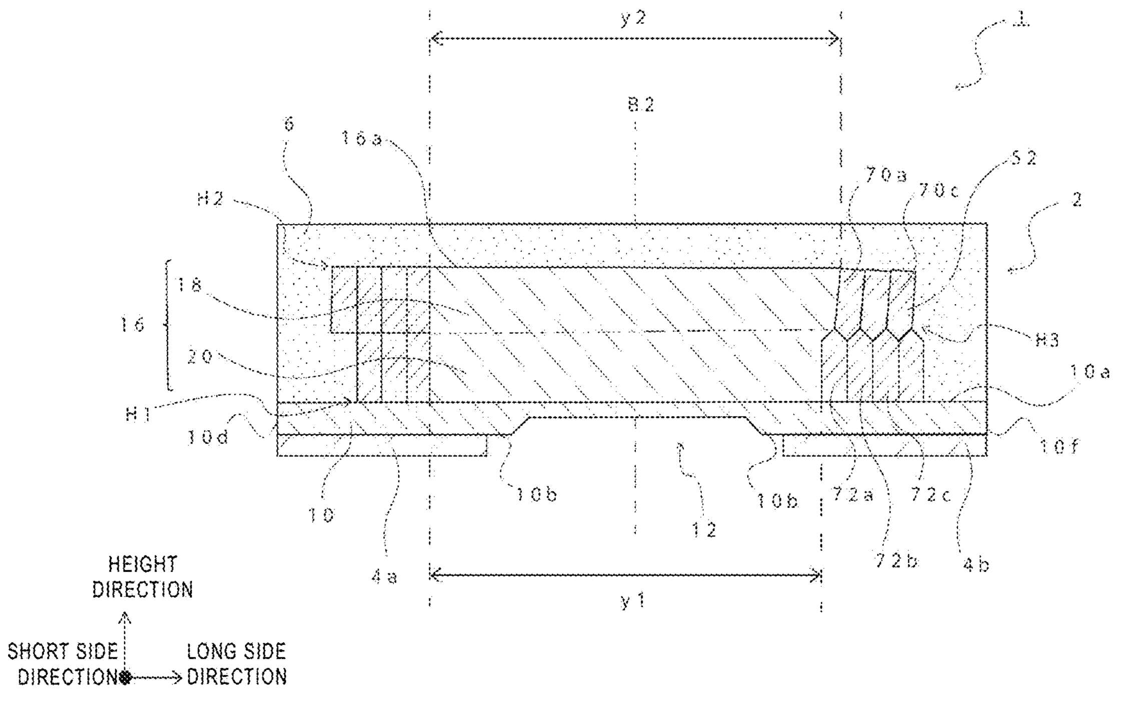
FIG. 6 is a cross-sectional view taken along a line A2-A2 of FIG. 1.
Figure 7:
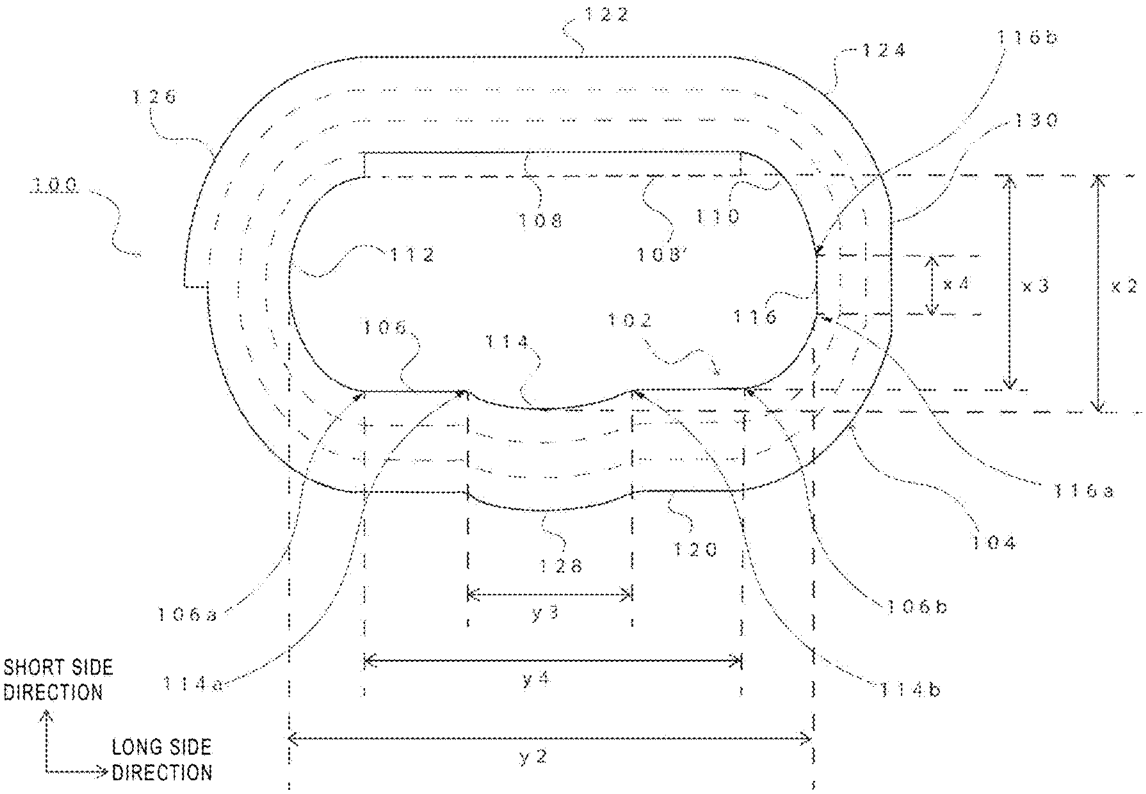
FIG. 7 is a view illustrating a contour line of a winding portion on a surface including an opening end surface of an upper stage portion of the inductor illustrated in FIG. 1.
Figure 8:
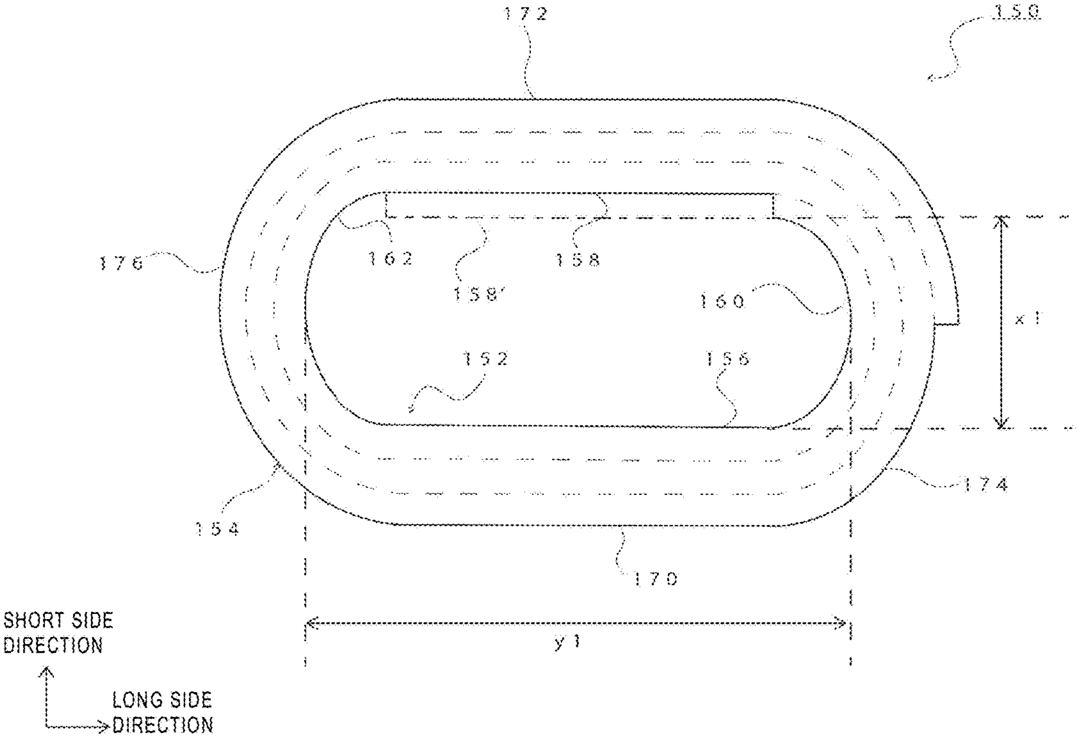
FIG. 8 is a view illustrating a contour line of a winding portion in a surface including a boundary surface of a lower stage portion of the inductor illustrated in FIG. 1.
Figure 9:
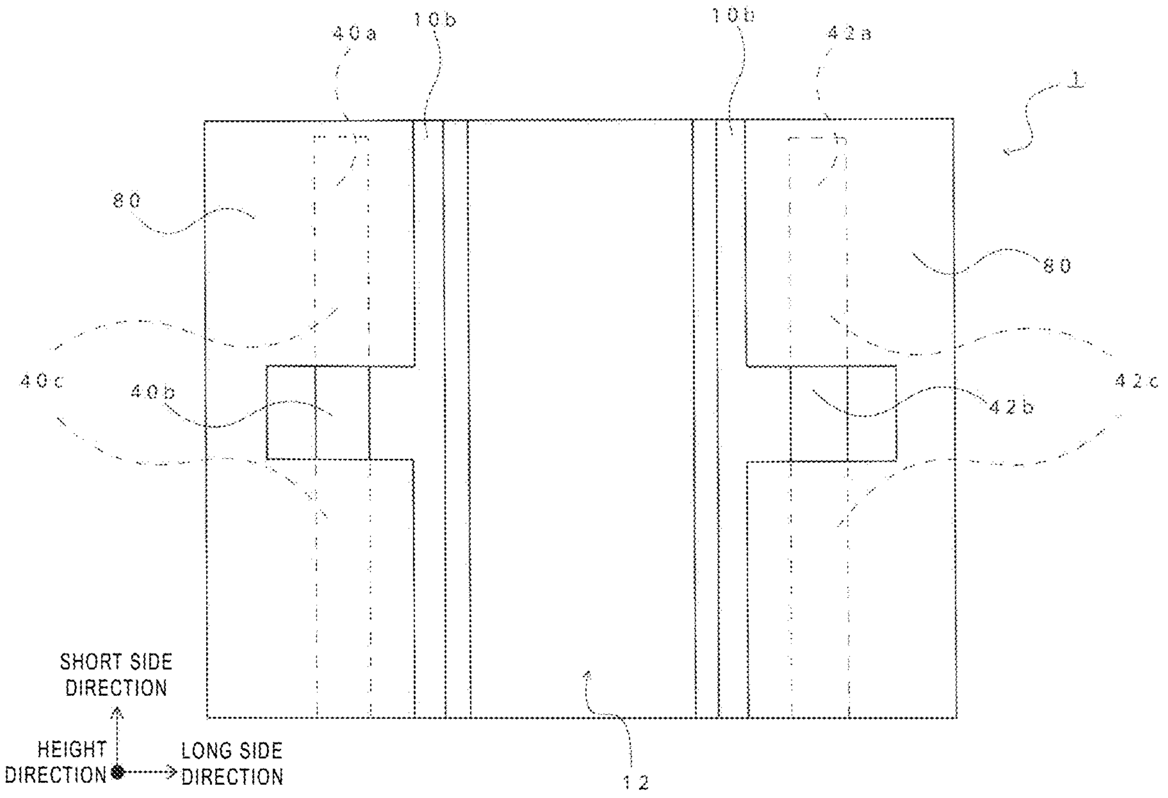
FIG. 9 is a view illustrating a conductive resin layer arranged in the inductor illustrated in FIG. 1.

An inductor according to Embodiment 1 of the present disclosure will be described with reference to FIG. 1 to FIG. 9. FIG. 1 is a top perspective view illustrating the inductor according to Embodiment 1 of the present disclosure. FIG. 2 is a bottom perspective view illustrating the inductor according to Embodiment 1 of the present disclosure. FIG. 3 is a perspective view illustrating only a magnetic base of the inductor of FIG. 1. FIG. 4 is a perspective view illustrating only a coil of the inductor of FIG. 1. FIG. 5 is a cross-sectional view taken along a line A1-A1 of FIG. 1. FIG. 6 is a cross-sectional view taken along a line A2-A2 of FIG. 1. FIG. 7 is a view illustrating a contour line of a winding portion on a surface including an opening end surface of an upper stage portion of the inductor illustrated in FIG. 1. FIG. 8 is a view illustrating a contour line of a winding portion in a surface including a boundary surface of a lower stage portion of the inductor illustrated in FIG. 1. FIG. 9 is a view illustrating a conductive resin layer arranged in the inductor illustrated in FIG. 1.

Embodiment 1

As illustrated in FIG. 1 and FIG. 2, the inductor 1 includes a body 2 and a pair of external terminals 4*a* and 4*b* formed on a surface of the body 2. The body 2 includes a magnetic base 8, a coil 54, and a magnetic outer coating 6.

The magnetic base 8 has a base portion 10 and a columnar portion 16 formed on an upper surface 10*a* of the base portion 10.

The coil 54 includes a winding portion 44 wound around the columnar portion 16 and a pair of extended portions 40 and 42 extended from an outer peripheral portion of the winding portion 44. The winding portion 44 is configured by one conductive wire having wide surfaces facing each other and having a rectangular cross section, is formed to be wound in two, upper and lower, stages with respect to the columnar portion 16 by bringing one of the wide surfaces into contact with a side surface of the columnar portion 16 and positioning both ends of the winding portion on an outer periphery, and has an upper stage portion 46 and a lower stage portion 48 that are connected to each other by the conductive wire forming an inner peripheral portion. The winding portion 44 has an annular shape having a short side direction and a long side direction in a plan view seen from an upper surface of the body 2. The upper stage portion of the winding portion 44 has a protruding portion protruding in the short side direction and a straight portion 52 extending in the short side direction and protruding in the long side direction. The pair of extended portions 40 and 42 is extended from the outer periphery of the winding portion 44 toward a side surface of the base portion 10, and tip portions 40*a* and 42*a* are arranged on a lower surface 10*b* of the base portion 10.

The magnetic outer coating 6 covers a part of the magnetic base 8, a part of the extended portions 40 and 42, and at least a part of the winding portion 44.

The pair of external terminals 4*a* and 4*b* are arranged so as to cover the tip portions 40*a* and 42*a* of the pair of extended portions 40 and 42 and the lower surface 10*b* around the tip portions 40*a* and 42*a*.

Hereinafter, each component member will be described in detail.

(1) Magnetic base

The magnetic base 8 includes the base portion 10 and the columnar portion 16.

<Base Portion>

As illustrated in FIG. 3, the base portion 10 is a plate-shaped member having a substantially rectangular shape in which the upper surface 10*a* and the lower surface 10*b* have a long side direction and a short side direction. The base portion 10 has notches 14 and 15 at a corner portion formed by a first side surface 10*c* extending in the long side direction and a second side surface 10*d* extending in the short side direction and a corner portion formed by the first side surface 10*c* and a fourth side surface 10*f* extending in the short side direction, respectively. The notches 14 and 15 are for arranging the extended portions 40 and 42 of the coil 54. As illustrated in FIG. 2, a recessed portion 12 is provided in the central portion of the lower surface 10*b* of the base portion 10 along the short side direction. The lower surface 10*b* of the base portion 10 is provided with external terminals 4*a* and 4*b* as described later, and serves as a mounting surface of the inductor 1. A length in the long side direction of the base portion 10 is, for example, about 1.4 mm to 2.2 mm, a length in the short side direction is, for example, 0.6 mm to 1.4 mm, and a thickness (a length between the upper surface 10*a* and the lower surface 10*b* is, for example, 0.1 mm to 0.2 mm <Columnar Portion>

The columnar portion 16 is arranged on the upper surface 10*a* of the base portion 10. In the columnar portion 16, a shape of a cross section substantially orthogonal to a winding axis B1 in a root portion on the base portion 10 side is a substantially oval shape having a short side direction and a long side direction. The winding axis B1 coincides with a center axis of the root portion of the columnar portion 16 on the base portion 10 side. In addition, the short side direction and the long side direction of the columnar portion 16 substantially coincide with the short side direction and the long side direction of the base portion 10. The side surface of the columnar portion 16 has two planar regions 28 and 30 extending in the long side direction of the base portion 10 and two curved surface regions 32 and 34 connecting the two planar regions 28 and 30. A height of the columnar portion 16 is approximately twice as large as that of the conductive wire forming the coil 54. When the columnar portion 16 is divided into upper and lower halves, i.e., an upper portion 18 and a lower portion 20, the first planar region 28 in the upper portion 18 has a protruding surface 22 protruding in the short side direction. The protruding surface 22 is a curved surface. A degree of protrusion of the protruding surface 22 increases as the distance from the base portion 10 increases. Therefore, the upper portion 18 of the columnar portion 16 becomes thicker as the distance from the base portion 10 increases (see FIG. 5).

In addition, a first curved surface region 32 in the upper portion 18 of the columnar portion 16 has a planar surface 24 extending in the short side direction. The degree of protrusion of the planar surface 24 increases as the distance from the base portion 10 increases. Therefore, the upper portion 18 of the columnar portion 16 becomes thicker as the distance from the base portion 10 increases (see FIG. 6).

Further, the columnar portion 16 is arranged on the upper surface 10*a* of the base portion 10 such that a length D1 between the winding axis B1 of the columnar portion 16 and the first side surface 10*c* of the base portion 10 is longer than a length D2 between the winding axis B1 of the columnar portion 16 and a third side surface 10e of the base portion 10.

Next, a material of the magnetic base 8 will be described. The magnetic base 8 is formed of a composite magnetic material containing magnetic powder and resin. The magnetic powder contains large particles (first magnetic powder) and small particles (second magnetic powder) having an average particle diameter smaller than that of the large particles. The average particle diameter of the large particles is, for example, equal to or more than 15 μm and equal to or less than 25 μm (i.e., from 15 μm to 25 μm), and can be, for example, from 16 μm to 23 μm, and the average particle diameter of the small particles is, for example, equal to or more than 1.5 μm and equal to or less than 4.0 μm (i.e., from 1.5 μm to 4.0 μm), and can be, for example, from 1.9 μm to 3.5 μm. The magnetic base 8 has a filling rate of magnetic powder of equal to or more than 60 wt %, preferably equal to or more than 80 wt %. As the magnetic powder, an iron-based metal magnetic powder such as Fe, Fe—Si—Cr, Fe—Ni—Al, Fe—Cr—Al, Fe—Si, Fe—Si—Al, Fe—Ni, or Fe—Ni—Mo, a metal magnetic powder having another composition, a metal magnetic powder of amorphous or the like, a metal magnetic powder having a surface coated with an insulator such as glass, a surface-modified metal magnetic powder, or a nano-level fine metal magnetic powder is used. As the resin, a thermosetting resin such as an epoxy resin, a polyimide resin, or a phenol resin, or a thermoplastic resin such as a polyethylene resin or a polyamide resin is used.

(2) Coil

As illustrated in FIG. 1 and FIG. 4, the coil 54 includes the winding portion 44 wound around the columnar portion 16 and the pair of extended portions 40 and 42 extended from an outer peripheral portion of the winding portion 44. The conductive wire used to form the coil 54 is a conductive wire having an insulating coating layer on the surface of a conductor and a fusion layer on the surface of the coating layer, and is a conductive wire having wide surfaces 64 and 66 facing each other and having a rectangular cross section (so-called rectangular wire). The conductor is formed of, for example, copper or the like, and has a width of 140 μm to 170 μm and a thickness of 67 μm to 85 μm. The coating layer is formed of an insulating resin such as polyamide-imide and has a thickness of, for example, 1 μm to 7 μm, preferably 6 μm. The fusion layer is formed of a thermoplastic resin, a thermosetting resin, or the like containing a self-fusing component so as to fix the wide surfaces of the conductive wire forming the winding portion to each other, and has a thickness of, for example, 1 μm to 3 μm, preferably 1.5 μm. Accordingly, a length w1 in a wire width direction of the conductive wire (a width of the wide surfaces 64 and 66, wire width) is, for example, 144 μm to 190 μm, and a thickness t1 (a length between the wide surfaces 64 and 66 facing each other) is, for example, 71 μm to 105 μm.

<Winding Portion>

The winding portion 44 is formed by using one such conductive wire, and is wound in two, upper and lower, stages so that both ends are positioned on the outer periphery, thereby forming the upper stage portion 46 and the lower stage portion 48. The upper stage portion 46 and the lower stage portion 48 are connected to each other by the conductive wire forming the inner peripheral portion. The winding portion 44 is wound around the columnar portion 16 such that a winding axis B2 substantially coincides with the winding axis B1 of the columnar portion 16 and the wide surface of the conductive wire is in contact with the side surface of the columnar portion 16. The winding portion 44 is arranged such that an opening end surface H1 of the lower stage portion 48 substantially coincides with the upper surface 10*a* of the base portion 10 of the magnetic base 8. In addition, an opening end surface H2 of the upper stage portion 46 substantially coincides with an upper surface 16*a* of the columnar portion 16. The winding portion 44 has an elongated annular shape having a short side direction and a long side direction in a plan view. The winding portion 44 has a first planar region 56 and a second planar region 58, and a first curved region 60 and a second curved region 62 that connect the two planar regions 56 and 58. The first planar region 56 is a region along the first planar region 28 of the columnar portion 16 of the magnetic base 8, and the second planar region 58 is a region along the second planar region 30 of the columnar portion 16. The first curved region 60 is a region along the first curved surface region 32 of the columnar portion 16, and the second curved region 62 is a region along the second curved surface region 34 of the columnar portion 16. The first planar region 56 of the upper stage portion 46 includes a protruding portion 50 protruding in the short side direction along the protruding surface 22 of the columnar portion 16. In addition, the first curved region 60 of the upper stage portion 46 includes the straight portion 52 extending in the short side direction along the planar surface 24 of the columnar portion 16.

(Protruding Portion)

The protruding portion 50 is a region where the conductive wire protrudes in the short side direction while being curved. The wire width direction of the conductive wire of the protruding portion 50 is inclined with respect to the winding axis B2. The wire width direction of the conductive wire of the protruding portion 50 is inclined so as to be away from the winding axis B2 as the distance from the lower stage portion 48 (see FIG. 5). Therefore, the protruding portion 50 protrudes in the short side direction between a boundary surface H3 between the upper stage portion 46 and the lower stage portion 48 and the opening end surface H2 of the upper stage portion 46, and the degree of protrusion is maximized at the opening end surface H2.

Referring to FIG. 7 and FIG. 8, the maximum dimension of the protruding portion 50 in the opening end surface H2 where the degree of protrusion is maximized will be described. First, a contour line 100 and 150 of the winding portion 44 illustrated in FIG. 7 and FIG. 8 will be described.

As illustrated in FIG. 7, the contour line 100 of the winding portion 44 in the opening end surface H2 of the upper stage portion 46 includes an inner peripheral contour line 102 of the winding portion 44 and an outer peripheral contour line 104 of the winding portion 44.

The inner peripheral contour line 102 is formed of an inner peripheral contour line 106 of the first planar region 56, an inner peripheral contour line 108 of the second planar region 58, an inner peripheral contour line 110 of the first curved region 60, and an inner peripheral contour line 112 of the second curved region 62. Further, the inner peripheral contour line 106 of the first planar region 56 includes an inner peripheral contour line 114 of the protruding portion 50, and the inner peripheral contour line 110 of the first curved region 60 includes an inner peripheral contour line 116 of the straight portion 52. Furthermore, the inner peripheral contour line 108 of the second planar region 58 includes an inner peripheral contour line 108' formed by a conductive wire positioned inside the inner peripheral contour line 108 and extending from the opening end surface H2 of the upper stage portion 46 toward the boundary surface H3 of the lower stage portion 48, as indicated by a dashed-dotted line.

The outer peripheral contour line 104 includes an outer peripheral contour line 120 of the first planar region 56, an outer peripheral contour line 122 of the second planar region 58, an outer peripheral contour line 124 of the first curved region 60, and an outer peripheral contour line 126 of the second curved region 62. Further, the outer peripheral contour line 120 of the first planar region 56 includes an outer peripheral contour line 128 of the protruding portion 50, and the outer peripheral contour line 124 of the first curved region 60 includes an outer peripheral contour line 130 of the straight portion 52.

As illustrated in FIG. 8, the contour line 150 of the winding portion 44 in the boundary surface H3 of the lower stage portion 48 of the winding portion 44 includes an inner peripheral contour line 152 of the winding portion 44 and an outer peripheral contour line 154 of the winding portion 44.

The inner peripheral contour line 152 is formed of an inner peripheral contour line 156 of the first planar region 56, an inner peripheral contour line 158 of the second planar region 58, an inner peripheral contour line 160 of the first curved region 60, and an inner peripheral contour line 162 of the second curved region 62. Furthermore, the inner peripheral contour line 158 of the second planar region 58 includes an inner peripheral contour line 158' formed by a conductive wire positioned inside the inner peripheral contour line 158 and extending from the boundary surface H3 of the lower stage portion 48 toward the opening end surface H2 of the upper stage portion 46, as indicated by a dashed-dotted line.

The outer peripheral contour line 154 is formed of an outer peripheral contour line 170 of the first planar region 56, an outer peripheral contour line 172 of the second planar region 58, an outer peripheral contour line 174 of the first curved region 60, and an outer peripheral contour line 176 of the second curved region 62.

A length y3 in a long side direction between two end portions 114*a* and 114*b* in the inner peripheral contour line 114 of the protruding portion 50 is about ¼ to ¾ of a length y4 between two end portions 106*a* and 106*b* in the inner peripheral contour line 106 of the first planar region 56 (see FIG. 7). The maximum length x2 in the short side direction between the inner peripheral contour line 108' formed by the conductive wire positioned inside the inner peripheral contour line 108 of the second planar region 58 and extending from the opening end surface H2 of the upper stage portion 46 toward the boundary surface H3 of the lower stage portion 48 and the inner peripheral contour line 114 of the protruding portion 50 is longer than a length x1 between the inner peripheral contour line 156 of the first planar region 56 of the lower stage portion 48 and the inner peripheral contour line 158' formed by the conductive wire positioned inside the inner peripheral contour line 158 of the second planar region 58 and extending from the boundary surface H3 of the lower stage portion 48 toward the opening end surface H2 of the upper stage portion 46 by approximately ⅙ to ⅓ of the length x1 (see FIG. 7 and FIG. 8). The length x2 corresponds to the width of the inner peripheral contour line 102 in the short side direction.

Next, an arrangement relationship between the conductive wire in the protruding portion 50 and the conductive wire of the lower stage portion 48 positioned below the protruding portion 50 will be described. As illustrated in FIG. 5, the conductive wire of each turn of the protruding portion 50 is not arranged immediately above the conductive wire of each turn of the lower stage portion 48. To be specific, a first conductive wire 70*a* in the first turn from inside the protruding portion 50 is arranged above a first conductive wire 72*a* in the first turn and a second conductive wire 72*b* in the second turn of the lower stage portion 48. That is, the first conductive wire 70*a* of the protruding portion 50 is supported by the first conductive wire 72*a* and the second conductive wire 72*b* of the lower stage portion 48. Similarly, each of the conductive wires in the second and subsequent turns of the protruding portion 50 is also supported by two conductive wires in the continuous turns of the lower stage portion 48. However, a conductive wire 70*c* in an outermost turn of the protruding portion 50 is supported only by a conductive wire 72*c* in an outermost turn of the lower stage portion 48. Further, the cross section of the boundary surface H3 between the conductive wire of the protruding portion 50 and the conductive wire of the lower stage portion 48 positioned below the protruding portion 50 has a substantially wavy shape.

(Straight Portion)

As illustrated in FIG. 6, the wire width direction of the conductive wire of the straight portion 52 is inclined with respect to the winding axis B2. The wire width direction of the conductive wire of the straight portion 52 is inclined so as to be away from the winding axis B2 as the distance from the lower stage portion 48 increases. Therefore, the straight portion 52 protrudes in the long side direction between the boundary surface H3 between the upper stage portion 46 and the lower stage portion 48 and the opening end surface H2 of the upper stage portion 46, and the degree of protrusion is maximized at the opening end surface H2.

Referring to FIG. 7, the length of the straight portion 52 in the short side direction will be described. A length x4 of the inner peripheral contour line 116 of the straight portion 52 (a length between two end portions 116*a*, 116*b*) is about ¼ to ¾ of the length x3 between the inner peripheral contour line 106 of the first planar region 56 and the inner peripheral contour line 108' formed by the conductive wire positioned inside the inner peripheral contour line 108 of the second planar region 58 and extending from the opening end surface H2 of the upper stage portion 46 toward the boundary surface H3 of the lower stage portion 48. Further, with reference to FIG. 8 in addition to FIG. 7, the degree of protrusion of the straight portion 52 will be described. A maximum length y2 between the inner peripheral contour line 116 of the straight portion 52 and the inner peripheral contour line 112 of the second curved region 62 in the long side direction is longer than a maximum length y1 between the inner peripheral contour line 160 of the first curved region 60 of the lower stage portion 48 and the inner peripheral contour line 162 of the second curved region 62 by about ⅛ to ⅙ of the maximum length y1. The length y2 corresponds to the width of the inner peripheral contour line 102 in the long side direction.

In addition, similarly to the conductive wire of the protruding portion 50, except for the conductive wire 70*c* in the outermost turn, the conductive wire of each turn of the straight portion 52 is supported by the conductive wires of two adjacent turns of the lower stage portion 48 positioned below the straight portion 52. Further, the cross section of the boundary surface H3 between the conductive wire of the straight portion 52 and the conductive wire of each turn of the lower stage portion positioned below the straight region also has a substantially wavy shape.

<Extended Portion>

Next, the extended portions 40 and 42 will be described with reference to FIG. 1 and FIG. 4.

The pair of extended portions 40 and 42 is continuous with the conductive wire in the outermost turn of the stage portions 46 and 48 of the winding portion 44, respectively. The pair of extended portions 40 and 42 is extended from the upper surface 10*a* side to the lower surface 10*b* side via the notches 14 and 15 of the base portion 10 of the magnetic base 8. The pair of extended portions 40 and 42 is twisted by approximately 90 degrees on the upper surface 10*a* side of the base portion 10 so that the wide surfaces 64 and 66 are approximately parallel to the upper surface 10*a* of the base portion 10. The tip portions 40*a* and 42*a* of the extended portions 40 and 42 extended to the lower surface 10*b* side are arranged such that one wide surface 66 is in contact with the lower surface 10*b*. In addition, the wire width of the conductive wire of a portion closer to the tip portions of the pair of extended portions 40 and 42 rather than a portion close to the notches 14 and 15 is wider than the wire width of the conductive wire of the winding portion 44, and the thickness of the conductive wire of the portion closer to the tip portions of the pair of extended portions 40 and 42 rather than the portion close to the notches 14 and 15 is thinner than the thickness of the conductive wire of the winding portion 44.

(3) Magnetic outer coating

The magnetic outer coating 6 covers the upper surface 10*a* of the base portion 10 of the magnetic base 8 and inner side surfaces of the notches 14 and 15, the columnar portion 16 of the magnetic base 8, the winding portion 44 of the coil 54, and regions of the extended portions 40 and 42 of the coil 54 excluding the tip portions 40*a* and 42*a*. However, an outer wide surface 64*a* of the conductive wire in the outermost turn in the second planar region 58 of the winding portion 44 may be exposed from the magnetic outer coating 6. In this case, it is desirable that the outer wide surface 64*a* of the conductive wire be arranged on substantially the same plane as the third side surface 10*e* of the base portion 10 of the magnetic base 8. This can be realized by appropriately setting the length D1 between the winding axis B1 of the columnar portion 16 and the first side surface 10*c* of the base portion 10, and the thickness t1 and the number of turns N of the conductive wire forming the coil 54.

The magnetic outer coating 6 is formed of a composite magnetic material containing magnetic powder and resin. The magnetic powder contains large particles (first magnetic powder) and small particles (second magnetic powder) having an average particle diameter smaller than that of the large particles. The average particle diameter of the large particles is, for example, equal to or more than 15 μm and equal to or less than 25 μm (i.e., from 15 pm to 25 μm), and can be, for example, from 16 μm to 23 μm, and the average particle diameter of the small particles is, for example, equal to or more than 1.5 μm and equal to or less than 4 μm (i.e., from 1.5 μm to 4 μm), and can be, for example, from 1.9 μm to 3.5 μm. The filling rate of the magnetic powder in the magnetic outer coating 6 is equal to or more than 60 wt %, preferably equal to or more than 80 wt %. As the magnetic powder, an iron-based metal magnetic powder such as Fe, Fe—Si—Cr, Fe—Ni—Al, Fe—Cr—Al, Fe—Si, Fe—Si—Al, Fe—Ni, or Fe—Ni—Mo, a metal magnetic powder having another composition, a metal magnetic powder of amorphous or the like, a metal magnetic powder having a surface coated with an insulator such as glass, a surface-modified metal magnetic powder, or a nano-level fine metal magnetic powder is used. As the resin, a thermosetting resin such as an epoxy resin, a polyimide resin, or a phenol resin, or a thermoplastic resin such as a polyethylene resin or a polyamide resin is used.

Note that the magnetic powder of the magnetic base 8 and the magnetic powder of the magnetic outer coating 6 may be magnetic powders having the same composition, the same average particle diameter of the first magnetic powder, the same average particle diameter of the second magnetic powder, the same density, or may be different magnetic powders. In addition, the resin of the magnetic base 8 and the resin of the magnetic outer coating 6 may be the same resin or different resin.

The body 2 is formed by the magnetic base 8, the coil 54, and the magnetic outer coating 6. The body 2 is formed in a substantially rectangular parallelepiped shape having upper and lower surfaces of a substantially rectangular shape having a long side direction and a short side direction, and four side surfaces adjacent to the upper and lower surfaces.

(4) External Terminal

As illustrated in FIG. 2, the pair of external terminals 4*a* and 4*b* is arranged on the mounting surface of the body 2 (that is, the lower surface 10*b* of the base portion 10 of the magnetic base 8) so as to be separated from each other. The pair of external terminals 4*a* and 4*b* is arranged so as to cover the tip portions 40*a* and 42*a* of the extended portions 40 and 42, respectively, and the lower surface 10*b* in the vicinity of the tip portions 40*a* and 42*a*. The pair of external terminals 4*a* and 4*b* includes a conductive resin layer 80 containing silver powder, a nickel layer, and a tin layer in the order of being arranged on the tip portions 40*a* and 42*a* and the lower surface 10*b* side. A thickness of the conductive resin layer 80 is 6 μm to 13 μm, a thickness of the nickel layer is 3 μm to 6 μm, a thickness of the tin layer is about 1 μm, and a thickness of the external terminals 4*a* and 4*b* is 10 μm to 20 μm.

Exterior resin (not illustrated) is formed on surfaces of the body 2 other than regions where the pair of external terminals 4*a* and 4*b* is arranged. The exterior resin contains a thermosetting resin such as an epoxy resin, a polyimide resin, or a phenol resin, or a thermoplastic resin such as a polyethylene resin or a polyamide resin, and may further contain a filler containing silicon, titanium, or the like.

Note that as illustrated in FIG. 9, the conductive resin layer 80 may be formed in a shape having a notch on the lower surface 10*b* and on both end regions 40*c* and 42*c* of the tip portions 40*a* and 42*a* so as to expose central regions 40*b* and 42*b* of the tip portions 40*a* and 42*a* sandwiched between both the end regions 40*c* and 42*c*. In this case, the nickel layer is arranged on the conductive resin layer 80 and on the central regions 40*b* and 42*b* of the tip portions 40*a* and 42*a*. The tin layer is arranged on the nickel layer. In addition, the notches are arranged so as to face each other.

In the inductor formed in this manner, the body 2 including the exterior resin has a length in the long side direction of, for example, 1.4 mm to 2.2 mm, a length in the short side direction, for example, 0.6 mm to 1.4 mm, and a height of, for example, 0.6 mm to 1 mm The inventors of the present disclosure have found that when the performance of a plurality of inductors configured as described above is compared, the DC superposition characteristics are different even when the filling rates of the magnetic powder of the magnetic bases and the filling rates of the magnetic powder of the magnetic outer coatings are the same. Therefore, the inventors focused on the possibility that the difference in the filling state of the magnetic powder particles affects the DC superposition characteristics of the inductor. As a result, it has been found that when the magnetic powder is uniformly dispersed, local concentration of magnetic flux is reduced as compared with the case where the magnetic powder is partially aggregated, so that magnetic saturation of the magnetic powder is less likely to occur and the DC superposition characteristics can be improved.

Next, in order to index the filling state of the magnetic powder, the inventors of the present disclosure have performed Voronoi partition with each particle as a generating point in the cross section of the body and found calculating the standard deviation of the area of each partitioned region.

Here, the Voronoi partition will be described.

The Voronoi partition is "a method of forming a Voronoi partition region by drawing a perpendicular bisector on a straight line connecting adjacent generating points and dividing a nearest neighbor region of each generating point".

Figure 10A:
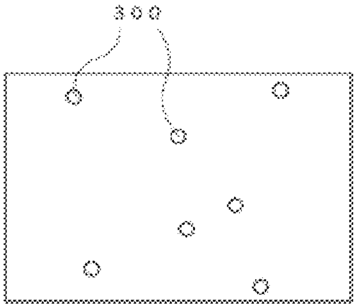
FIGS. 10A to 10D are diagrams illustrating Voronoi partition.

A procedure of forming the Voronoi partition region is as follows:

STEP 1: A plurality of generating points 300 to be analyzed is prepared (see FIG. 10A).

Figure 10B:
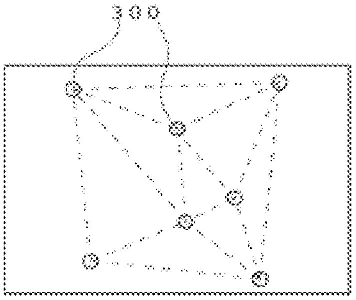

STEP 2: Each of the generating points 300 are connected by a line (see FIG. 10B).

Figure 10C:
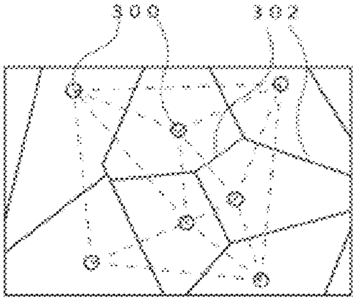
Figure 10D:
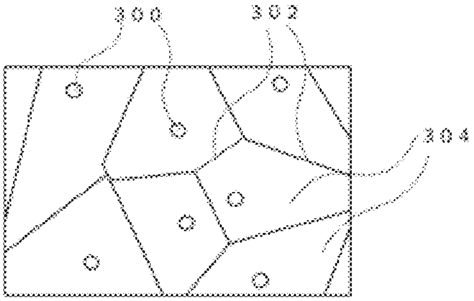

STEP 3: Perpendicular bisectors of the sides of the triangle formed by STEP 2 are drawn, and the perpendicular bisectors are connected (see FIG. 10C). A region divided by perpendicular bisectors 302 combined as that is a Voronoi partition region 304 (see FIG. 10D).

Figure 11A:
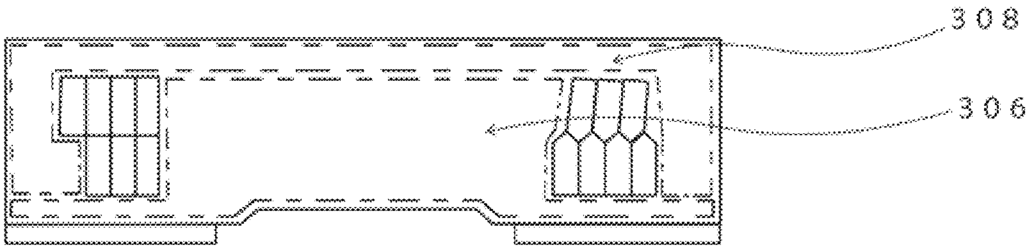
FIG. 11A is a diagram illustrating an example of a cross section of a body.
Figure 11B:
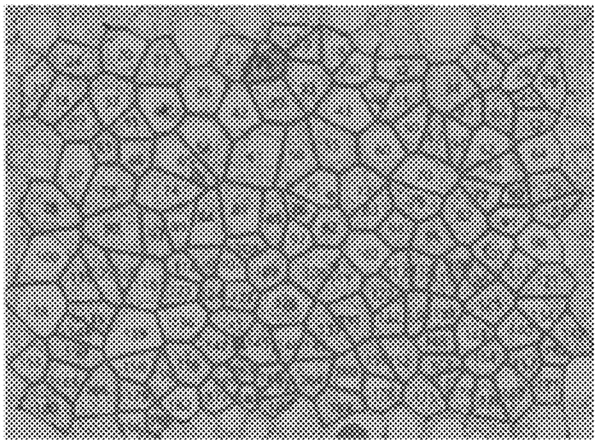
FIG. 11B is a diagram illustrating an example of a Voronoi partition region of a magnetic base region.
Figure 11C:
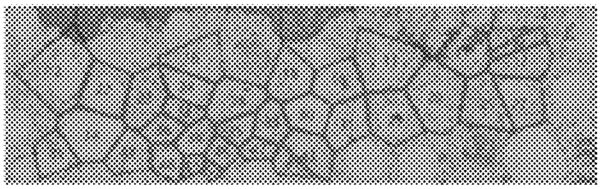
FIG. 11C is a diagram illustrating an example of a Voronoi partition region of a magnetic outer coating region.

Based on the above findings, the inventors of the present disclosure:

(1) actually manufactured the inductor 1 according to Embodiment 1;

(2) in a cross section including the winding axis B2 of the winding portion 44 and extending in the long side direction of the body 2, performed Voronoi partition with the center of gravity of each magnetic powder as a generating point; and (3) as illustrated in FIGS. 11A to 11C, with respect to a magnetic base region 306 and a magnetic outer coating region 308, calculated the standard deviation of an area of the Voronoi partition region with the magnetic powder of each region as a generating point.

It suggests that as the value of the standard deviation calculated in this manner is smaller, intervals at which the magnetic powders are arranged are closer to equal. That is, it is found that as the value of the standard deviation is smaller, the magnetic saturation is relaxed, and thus the DC superposition characteristics become better.

FIGS. 11A and 11B show an example of Voronoi partition in the magnetic base region 306 and the magnetic outer coating region 308 of the cross section extending in the long side direction of the body 2. FIG. 11A is a diagram illustrating an example of a cross section of the body, FIG. 11B is a diagram illustrating an example of Voronoi partition of the magnetic base region 306, and FIG. 11C is a diagram illustrating an example of Voronoi partition of the magnetic outer coating region 308.

EXAMPLE 1

In this example, the same material was used for the material of the large particles of the magnetic powder of the magnetic base and the material of the large particles of the magnetic powder of the magnetic outer coating, the same material was used for the material of the small particles of the magnetic powder of the magnetic base and the material of the small particles of the magnetic powder of the magnetic outer coating, and the same material was used for the resin of the magnetic base and the resin of the magnetic outer coating to form the body. In addition, the ratio of the average particle diameter of the small particles to the average particle diameter of the large particles used for the magnetic powder of the magnetic base was 7.5, and the ratio of the average particle diameter of the small particles to the average particle diameter of the large particles used for the magnetic powder of the magnetic outer coating was 6.3.

The body 2 used in this example had dimensions of a length of 1.6 mm in the long side direction and a length of 0.8 mm in the short side direction. Note that the material, a particle size (μm), and a ratio (%) of large particles and small particles to the total volume of the magnetic powder used in this embodiment were as shown in Table 1.

TABLE 1

| | | Magnetic base | Magnetic outer coating |
|---|---|---|---|
| Large particles | Material | Fe—Si-based metal magnetic material | Fe—Si-based metal magnetic material |
| | Average particle diameter D50 (μm) | 22.5 | 20.9 |
| | D10 particle diameter (μm) | 11 | 14.5 |
| | D90 particle diameter (μm) | 47.2 | 30.1 |
| | Ratio (%) of large particles and small particles to total volume | 70 | 85 |
| Small particles | Material | Fe-based metal magnetic material | Fe-based metal magnetic material |
| | Average particle diameter D50 (μm) | 3.0 | 3.3 |
| | D10 particle diameter (μm) | 1.4 | 1.6 |
| | D90 particle diameter (μm) | 7.1 | 7.4 |
| | Ratio (%) of large particles and small particles to total volume | 30 | 15 |

Hereinafter, steps performed in this example will be described.

Figure 12A:
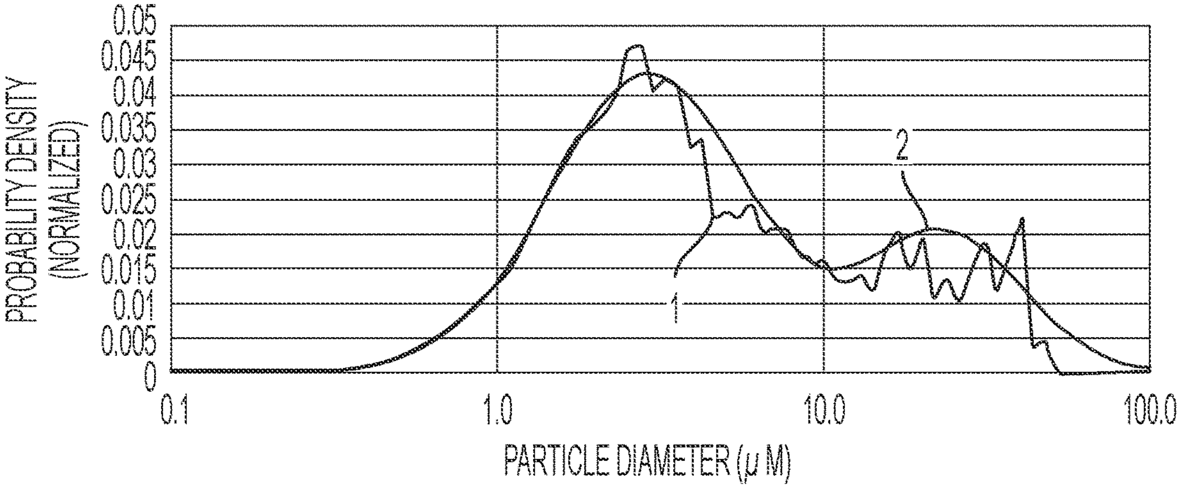
FIG. 12A is a graph illustrating a particle size distribution in a cross section of a magnetic base.
Figure 12B:
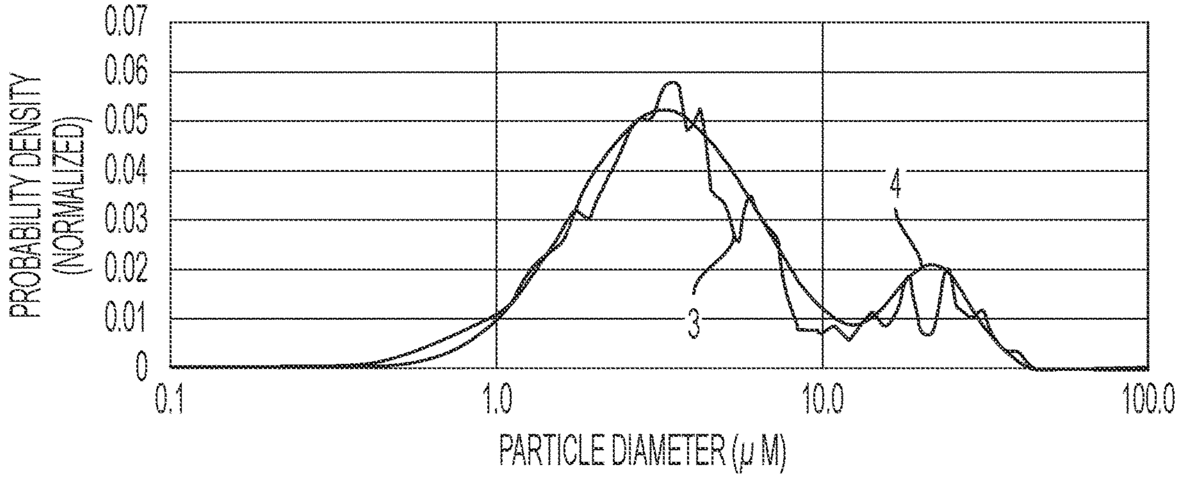
FIG. 12B is a graph illustrating a particle size distribution in a cross section of a magnetic outer coating.

STEP 1:

The particle diameter was measured by image analysis for each of the cross sections of the magnetic base and the magnetic outer coating in the cross section including the winding axis of the winding portion of the body and extending in the long side direction of the body, and a graph illustrating the particle size distribution as illustrated in FIGS. 12A and 12B was created. FIG. 12B is a graph in which the particle diameter is measured by image analysis of a cross section of the magnetic base, and FIG. 12B is a graph in which the particle diameter is measured by image analysis of a cross section of the magnetic outer coating. In each graph, a horizontal axis represents the particle diameter (pm) and a vertical axis represents the probability density (normalized). Reference numeral 1 denotes a particle size distribution counted by image analysis of a cross section of the magnetic base, and reference numeral 2 denotes a particle size distribution as a result of fitting to the reference numeral 1. In addition, reference numeral 3 denotes a particle size distribution counted by image analysis of a cross section of the magnetic outer coating, and reference numeral 4 denotes a particle size distribution as a result of fitting to the reference numeral 3.

Figure 13A:
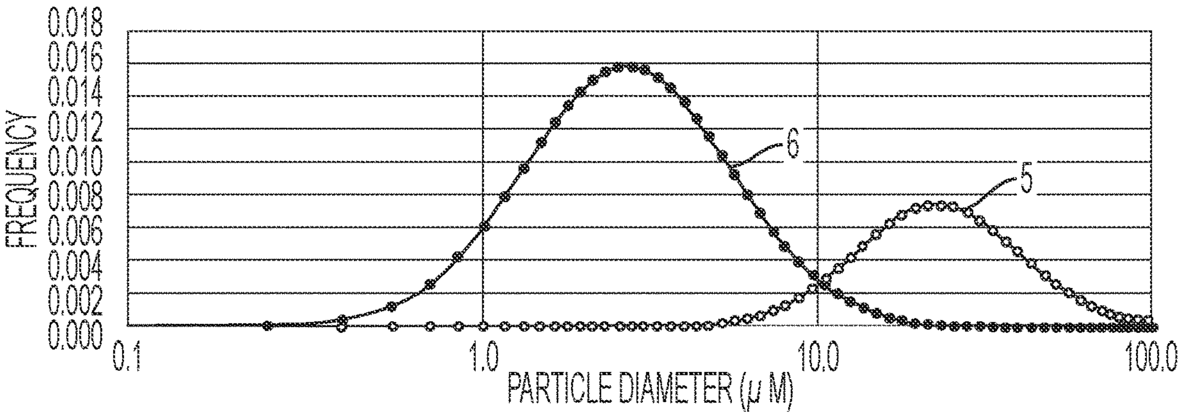
FIG. 13A is a graph illustrating particle size distributions of large particles and small particles in a cross section of the magnetic base.
Figure 13B:
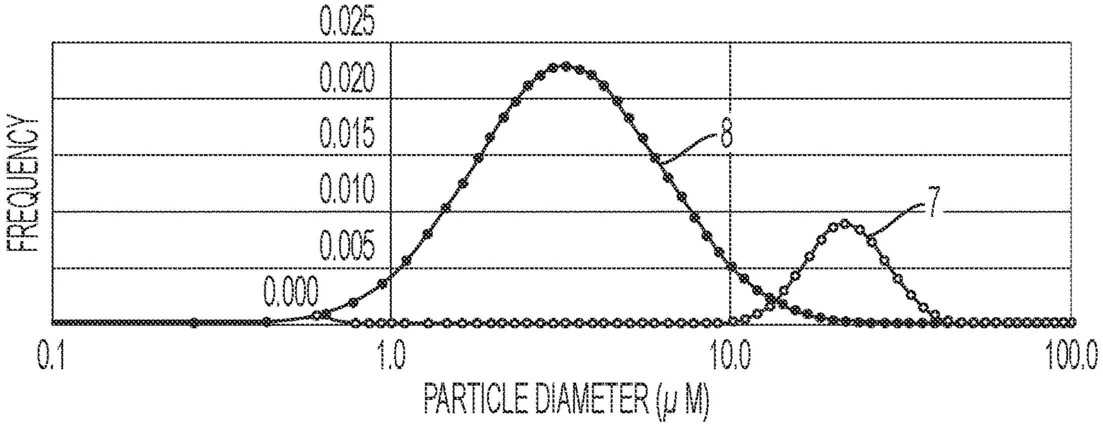
FIG. 13B is a graph illustrating particle size distributions of large particles and small particles in a cross section of the magnetic outer coating.

STEP 2:

In order to express the reference numerals 2 and 4 in FIGS. 12A and 12B by the particle size distribution of the large particles and the particle size distribution of the small particles, a graph illustrating the particle size distribution of each of the large particles and the small particles was created as illustrated in FIGS. 13A and 13B. FIG. 13A is a graph illustrating the particle size distribution of large particles and small particles in the cross section of the magnetic base, and FIG. 13B is a graph illustrating the particle size distribution of large particles and small particles in the cross section of the magnetic outer coating. In each graph, the horizontal axis represents the particle diameter (pm) and the vertical axis represents a frequency. In FIG. 13A, reference numeral 5 denotes a logarithmic normal distribution of large particles, reference numeral 6 denotes a logarithmic normal distribution of small particles, and the sum of the reference numerals 5 and 6 in FIG. 13A is the reference numeral 2 in FIG. 12A. Further, in FIG. 13B, reference numeral 7 denotes a logarithmic normal distribution of large particles, reference numeral 8 denotes a logarithmic normal distribution of small particles, and the sum of the reference numerals 7 and 8 in FIG. 13B is the reference numeral 4 in FIG. 12B.

Figure 14A:
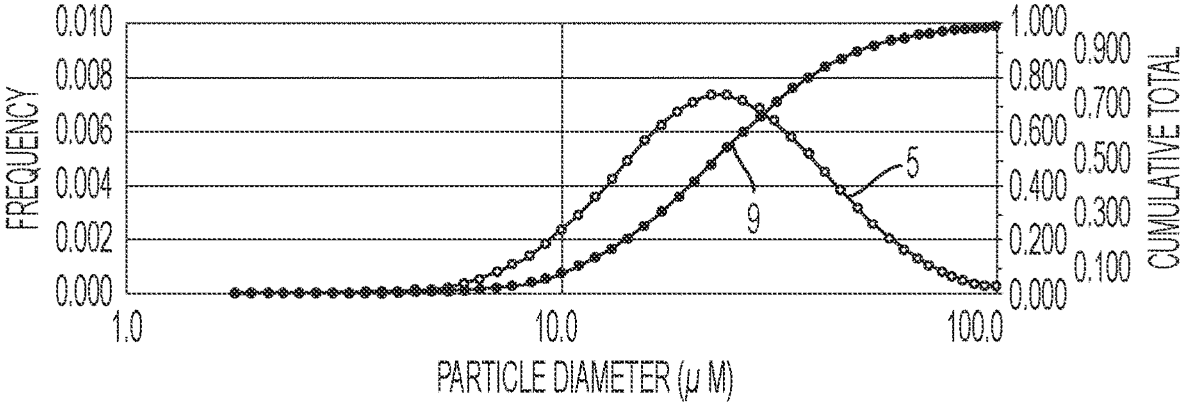
FIG. 14A is a graph illustrating a particle size distribution of large particles and a cumulative frequency distribution of a logarithmic normal distribution of large particles in a cross section of the magnetic base.
Figure 14B:
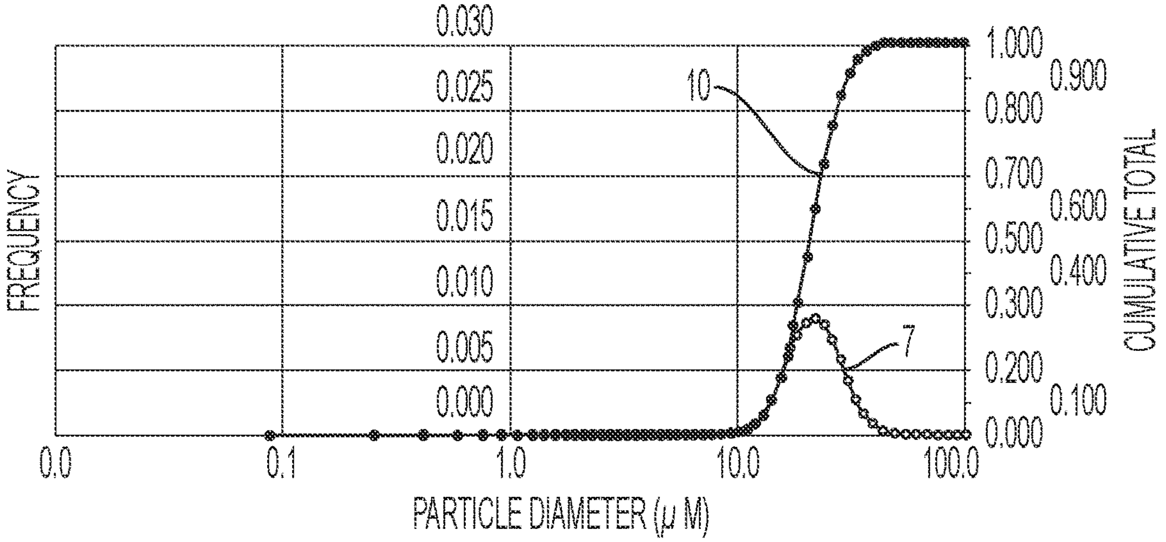
FIG. 14B is a graph illustrating a particle size distribution of large particles and a cumulative frequency distribution of a logarithmic normal distribution of large particles in a cross section of the magnetic outer coating.

STEP 3:

Next, based on the reference numerals 5 and 7 in FIGS. 13A and 13B, a graph illustrating the logarithmic normal distribution of large particles and a cumulative frequency distribution of the logarithmic normal distribution of large particles as illustrated in FIGS. 14A and 14B was created. FIG. 14A is a graph illustrating the logarithmic normal distribution of the large particles of the reference numeral 5 in FIG. 13A and the cumulative frequency distribution of the logarithmic normal distribution of the large particles, and FIG. 14B is a graph illustrating the logarithmic normal distribution of the large particles of the reference numeral 7 in FIG. 13B and the cumulative frequency distribution of the logarithmic normal distribution of the large particles. In each graph, the horizontal axis represents the particle diameter (μm), the left vertical axis represents the frequency, and the right vertical axis represents a cumulative total. Reference numeral 9 denotes the cumulative frequency distribution of the logarithmic normal distribution of the large particles of the reference numeral 5, and reference numeral 10 denotes the cumulative frequency distribution of the logarithmic normal distribution of the large particles of the reference numeral 7.

STEP 4:

With reference to FIGS. 13A, 13B, 14A and 14B, a lower limit value of the particle diameter to be subjected to the Voronoi partition of the cross section of the magnetic base and the magnetic outer coating in the body was determined. At this time, it is desirable to determine the lower limit value of the particle diameter to be subjected to the Voronoi partition of the cross section of the magnetic base and the magnetic outer coating in the body is determined so that the small particle diameter is not recognized as much as possible and the particle on the lower limit side of the large particle is recognized. As a result of the study, the particle diameter when the cumulative total in the rise of the particle size distribution of large particles is 0.01 was defined as the lower limit value. As a result, the lower limit value of the particle diameter to be subjected to the Voronoi partition of the cross section of the magnetic base in the body was 6.5 μm, and the lower limit value of the particle diameter to be subjected to the Voronoi partition of the cross section of the magnetic outer coating in the body was 11.5 μm.

Figure 15:
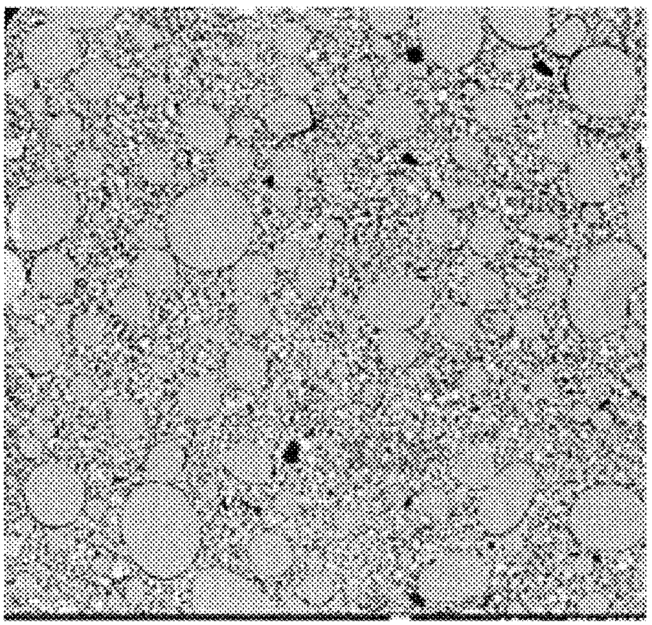
FIG. 15 is a diagram schematically illustrating a cross-sectional image of the magnetic base.

STEP 5:

FIG. 15 is obtained by extracting particles having a particle diameter equal to or larger than the lower limit value using a cross-sectional image of the magnetic base in the body. At this time, from the two-dimensional cross-sectional image, by extracting particles having an equivalent circle diameter of 6.5 μm, which indicates the diameter of a perfect circle corresponding to the area of a figure drawn in the image, it was possible to extract particles to be subjected to the Voronoi partition of the cross section of the magnetic base in the body.

Next, a method for calculating the particle diameter shown in Table 1 will be described.

In the present specification, the average particle diameter is a median size D50, and means a volume-based median size. In addition, D10 and D90 are particle diameters when the cumulative frequency is 10% and 90%, respectively, on a volumetric basis. The volume ratio and the particle diameter of the large particles and the small particles can be determined by analyzing a scanning electron microscope (SEM) image obtained by photographing a cross section.

First, a cross section including the winding axis of the winding portion of the body and extending in the long side direction of the body is cut out by a wire saw or the like to be divided into individual pieces. After the cross section is processed to be flat by using a milling apparatus or the like, five visual fields of reflected electron images of 300 times magnified images and 1000 times magnified images are acquired by an SEM in a predetermined region of the magnetic base in the body and a predetermined region of the magnetic outer coating in the body, respectively. Note that the reason why both the 300 times magnified image (low magnification image) and the 1000 times magnified image (high magnification image) are acquired is to accurately analyze both the particle diameter of the large particle and the particle diameter of the small particle.

Next, a binarization processing is performed on the obtained SEM image using image analysis software, and the equivalent circle diameters of the cross sections of the magnetic powder in the predetermined region of the magnetic base and the predetermined region of the magnetic outer coating are obtained in the binarized image. The frequency is counted for the equivalent circle diameter determined by image analysis to obtain a histogram. There is a difference in frequency due to a difference in magnification between the 300 times magnified image and the 1000 times magnified image. In order to match the frequency in the 1000 times magnified image with the frequency in the 300 times magnified image, the frequency in the 1000 times magnified image is multiplied by the square of (1000/300). Further, the value of the particle diameter at which the variation of the histogram of the 1000 times magnified image becomes larger than the variation of the histogram of the 300 times magnified image is obtained, the value of the 300 times magnified image is adopted for the frequency of the particle diameter equal to or larger than the obtained particle diameter, and the value of the 1000 times magnified image is adopted for the frequency of the particle diameter smaller than the obtained particle diameter, thereby forming one histogram.

In order to set the frequency of the histogram to a volume-based distribution, calculation is performed by multiplying the frequency by the volume calculated from a particle diameter interval and dividing the result by the particle diameter based on the quantitative microscopy (Reference: R. T. DeHoff, F N Rhines, "Quantitative microscopy", translated by Makishima Kunio, Shinohara Yasutada, Komori Takashi, Uchida Rokakuho Shinsha, 1972, pp. 167-203). The calculation described above is based on a study of quantitative microscopy, in which as the particle is in the smaller cross-sectional area, higher frequency appears. Here, normalization is performed by dividing the frequency of each interval by the total sum of the frequencies so that the total sum of the frequencies becomes 1.

The volume-based histogram thus obtained is fitted with the sum of two logarithmic normal distributions (the sum of the logarithmic normal distribution of large particles and the logarithmic normal distribution of small particles) to calculate the average particle diameter of each of the large particles and the small particles and the volume ratio (blending ratio) between the large particles and the small particles. The probability density function of the logarithmic normal distribution is given by the following Equation 1.

$$f(x) = \begin{cases} \frac{1}{\sqrt{2\pi}\sigma x}\exp\left\{\frac{-(\log x-\mu)^2}{2\sigma^2}\right\}, & x > 0 \\ 0, & x \le 0 \end{cases} \quad \text{(Equation 1)}$$

In the above equation, a variable x corresponds to a data-interval particle diameter, σ corresponds to a logarithmic variance, and μ, corresponds to a logarithmic mean. Since the probability density function is expressed for each of the large particles and the small particles, the variables each are x1 and x2 given as the particle diameter, and σ1, σ2, μ1, and μ2 given arbitrarily. Note that 1 at the end of each variable means a large particle, and 2 means a small particle. Further, in order to express the probability density function of the large particles and the probability density function of the small particles as one probability density function, each probability density function is multiplied by a predetermined ratio (p1, p2) and the sum is calculated. The probability density function obtained by the composition of the large particles and the small particles as described above is normalized so that the probability density function can be fitted to the volume-based histogram.

Among the variables of the probability density function, the data-interval particle diameters x1 and x2 are given by the data-interval of the volume-based histogram. Therefore, in order to fit the volume-based histogram by the composite probability density function, the variances σ1 and σ2, the averages (φ1 and φ2, and the ratios p1 and p2 are optimized as variables by the least squares method so that the difference between the both is minimized From the probability density functions of the large particles and the small particles given by the variables optimized as described above, a value in a data-interval when the normalized density function is accumulated to be 0.5 is obtained, thereby obtaining the average particle diameter of each of the large particles and the small particles. Further, the volume-based blending ratio (volume ratio) of large particles and small particles is obtained from the optimized ratio of p1 and p2.

Further, on the basis of the image subjected to the binarization processing of the obtained SEM image using the image analysis software, Voronoi partition is performed as illustrated in FIGS. 11B and 11C using Voronoi partition software "WinROOF2018" (manufactured by MITANI CORPORATION). At this time, as illustrated in FIG. 11B, the magnetic base region 306 was subjected to Voronoi partition with a magnetic powder having an equivalent circle diameter of equal to or more than 6.5 μm as a generating point, and as illustrated in FIG. 11C, the magnetic outer coating region 308 was subjected to Voronoi partition with a magnetic powder having an equivalent circle diameter of equal to or more than 11.5 μm as a generating point. The standard deviation of the area of the Voronoi partition region obtained by the Voronoi partition was calculated, and the result was as shown in Table 2. In addition, the filling rate was obtained by calculating an area ratio of the metal particles in the observation field of view based on the image subjected to the binarization processing on the SEM image, and the result was as shown in Table 2. The interpretation of the area ratio as the filling rate is known based on the quantitative microscopy (Reference: R. T. DeHoff, F. N. Rhines, translated by Makishima Kunio, Shinohara Yasutada, Komori Takashi, "Quantitative microscopy", Uchida Rokakuho Shinsha, 1972, pp. 52-55).

TABLE 2

| | Magnetic base | Magnetic outer coating |
|---|---|---|
| Filling rate (%) of magnetic powder | 80 | 77 |
| Standard deviation of area of Voronoi partition region | 298 | 194 |

From the above results, it was found that the standard deviation of the area of the Voronoi partition region of the magnetic outer coating 6 was smaller than the standard deviation of the area of the Voronoi partition region of the magnetic base 8. Further, it was found that the filling rate of the magnetic powder of the magnetic base was larger than the filling rate of the magnetic powder of the magnetic outer coating. In such an inductor, since the magnetic permeability of the magnetic base is higher than that of the magnetic outer coating, the inductance value can be made larger than that of the existing inductor.

EXAMPLE 2

In this example, the body was formed by using different materials for the material of the large particles of the magnetic powder of the magnetic base and the material of the large particles of the magnetic powder of the magnetic outer coating, using the same material for the material of the small particles of the magnetic powder of the magnetic base and the material of the small particles of the magnetic powder of the magnetic outer coating, and using the same material for the resin of the magnetic base and the resin of the magnetic outer coating. In addition, the ratio of the average particle diameter of the small particles to the average particle diameter of the large particles used for the magnetic powder of the magnetic base was 8, and the ratio of the average particle diameter of the small particles to the average particle diameter of the large particles used for the magnetic powder of the magnetic outer coating was 5.3. The body 2 used in this example had dimensions of a length of 2.0 mm in the long side direction and a length of 1.2 mm in the short side direction. Note that the material, particle size (μm), and ratio (%) of large particles and small particles to the total volume of the magnetic powder used in this example were as shown in Table 3.

TABLE 3

| | | Magnetic base | Magnetic outer coating |
|---|---|---|---|
| Large particles | Material | FeSiCr-based metal magnetic material | Fe—Si-based metal magnetic material |

TABLE 3-continued

| | | Magnetic base | Magnetic outer coating |
|---|---|---|---|
| | Average particle diameter D50 (μm) | 32 | 16 |
| | Ratio (%) of large particles and small particles to total volume | 65 | 50 |
| Small particles | Material | Fe-based metal magnetic material | Fe-based metal magnetic material |
| | Average particle diameter D50 (μm) | 4 | 3 |
| | Ratio (%) of large particles and small particles to total volume | 35 | 50 |

The magnetic base region 306 and the magnetic outer coating region 308 were subjected to Voronoi partition in the same manner as in Example 1. At this time, Voronoi partition was performed with a magnetic powder having an equivalent circle diameter of equal to or more than 6 μm as a generating point, and the standard deviation of the area of the Voronoi partition region was calculated, and the result was as shown in Table 4. In addition, the filling rate was obtained by calculating the area ratio of the metal particles in the observation field of view based on the image subjected to the binarization processing on the SEM image, and the result was as shown in Table 4.

TABLE 4

| | Magnetic base | Magnetic outer coating |
|---|---|---|
| Filling rate (%) of magnetic powder | 82 | 83 |
| Standard deviation of area of Voronoi partition region | 239 | 283 |

From the above results, it was found that the standard deviation of the area of the Voronoi partition region of the magnetic base 8 was smaller than the standard deviation of the area of the Voronoi partition region of the magnetic outer coating 6. Further, it was found that the filling rate of the magnetic powder of the magnetic outer coating was larger than the filling rate of the magnetic powder of the magnetic base. Therefore, in the inductor 1 manufactured in this example, a rated current value determined by the decrease in the inductance value can be increased.

From the results of Example 1 and Example 2, it was found that the standard deviation of the area of the Voronoi partition region of the magnetic base 8 is preferably equal to or more than 230 and equal to or less than 300 (i.e., from 230 to 300), and the standard deviation of the area of the Voronoi partition region of the magnetic outer coating 6 is preferably equal to or more than 190 and equal to or less than 290 (i.e., from 190 to 290). These standard deviation ranges were also effective in reducing the concentration of magnetic flux between locally adjacent particles in each of the magnetic base 8 and the magnetic outer coating 6.

In addition, from the results of Example 1 and Example 2 described above, it was found that the standard deviation of the area of the Voronoi partition region of the magnetic outer coating 6 was different from the standard deviation of the area of the Voronoi partition region of the magnetic base 8. This revealed that an inductor having a desired inductance value and/or a rated current value can be manufactured by adjusting the standard deviation of the area of the Voronoi partition region of the magnetic base 8 and/or the standard deviation of the area of the Voronoi partition region of the magnetic outer coating 6.

In addition, generally, the filling rate of the magnetic powder filled in the inductor contributes to the determination of the magnetic permeability of the inductor, and therefore contributes to the determination of an inductance value L of the inductor. In the inductor 1 manufactured in Example 1 and Example 2 described above, the filling rate of the magnetic powder contained in the magnetic base 8 was equal to or more than 80%, and the filling rate of the magnetic powder contained in the magnetic outer coating 6 was equal to or more than 77%, both of which were sufficient filling rates. However, it is known that there is a trade-off relationship between the magnetic permeability and the rated current value determined by the decrease in the inductance value. When the magnetic permeability is high, the magnetic material is magnetically saturated at a lower magnetic field. Then, even when the magnetic field generated by the direct current applied to the inductor is low, the magnetic material of the inductor is magnetically saturated. Therefore, even when the value of the direct current applied to the inductor is small, the inductance value obtained by an alternating current decreases due to magnetic saturation of the magnetic material. Therefore, when the magnetic permeability is too large, that is, when the filling rate is too large, the DC superposition characteristics deteriorate. Therefore, the inventors of the present disclosure determined that it is desirable to set the upper limit of the filling rate of the magnetic powder contained in the magnetic base 8 and the magnetic outer coating 6 to 85%. That is, it was concluded that the filling rate of the magnetic powder contained in the magnetic base 8 is preferably equal to or more than 80% and equal to or less than 85% (i.e., from 80% to 85%), and the filling rate of the magnetic powder contained in the magnetic outer coating 6 is preferably equal to or more than 77% and equal to or less than 85% (i.e., from 77% to 85%).

Therefore, the inductor according to an aspect of the present disclosure includes the coil 54 including the winding portion 44 and the pair of extended portions 40 and 42 extended from the winding portion 44, and the body 2 having the coil 54 embedded therein and containing a magnetic powder containing a first magnetic powder and a second magnetic powder, in which the average particle diameter of the first magnetic powder is larger than the average particle diameter of the second magnetic powder, and in a cross section of the body 2 including a winding axis of the winding portion 44 and extending in the long side direction of the body 2, Voronoi partition is performed with the center of gravity of each magnetic powder as a generating point, and when a standard deviation of an area of a Voronoi partition region with a magnetic powder having a particle diameter of equal to or more than 6 μm as a generating point is calculated, the standard deviation is equal to or less than 300.

The inductor configured as described above can suppress a decrease in the rated current value determined by a decrease in the inductance value even when the filling rate of the magnetic powder is increased.

Further, the magnetic powder filled in the inductor configured as described above contains large particles and small particles having different average particle diameters. As a result, gaps between the large particles are filled with the small particles, and the filling rate of the magnetic powder efficiently filled in the inductor can be increased.

Manufacturing Method

Next, a method of manufacturing the inductor 1 configured as described above will be described.

The method of manufacturing the inductor 1 includes:

(1) a step of forming the magnetic base 8;

(2) a step of forming the coil 54;

(3) a step of molding and curing;

(4) a step of forming an exterior resin on the body;

(5) a step of removing the exterior resin of the body, and the coating layer and the fusion layer of the conductive wire; and (6) a step of forming the external terminals 4*a* and 4*b*.

(1) Step of Forming Magnetic Base 8

A mixture of magnetic powder and resin is filled in a cavity of a mold capable of forming the columnar portion 16 and the base portion 10. The mold includes, for example, a cavity having a first portion having a shape and a depth for forming the base portion 10 and a second portion provided on a bottom surface of the first portion and having a shape and a depth for forming the columnar portion. The mixture of the magnetic powder and the resin is pressurized in a mold at pressures of about 1 t/cm$^2$ to 10 t/cm$^2$ for several seconds to several minutes to form the magnetic base. At this time, the mixture of the magnetic powder and the resin may be pressurized in a state in which the mixture is heated to a temperature equal to or higher than a softening temperature of the resin (for example, 60° C. to 150° C.) to form the magnetic base 8. Next, a temperature equal to or higher than a curing temperature of the resin (for example, 100° C. to 220° C.) is applied to cure the mixture, thereby obtaining the magnetic base 8 having the base portion 10 and the columnar portion 16 formed on the base portion 10. Note that semi-curing may be performed. In this case, semi-curing is performed by adjusting the temperature (for example, 100° C. to 220° C.) and a curing time (1 minute to 60 minutes).

(2) Step of Forming Coil 54

The coil 54 having the winding portion 44 and the pair of extended portions 40 and 42 extended from the winding portion 44 is formed by winding a conductive wire around the columnar portion 16 of the obtained magnetic base 8. The conductive wire has a coating layer, and a rectangular wire having a rectangular cross section is used. In addition, the winding portion 44 is formed such that one of the wide surfaces of the conductive wire is in contact with the side surface of the columnar portion 16 and both ends of the conductive wire are positioned on the outer periphery in two, upper and lower, stages with respect to the columnar portion 16.

The pair of extended portions 40 and 42 of the coil 54 is formed with tip portions 40*a* and 42*a* each having a wide surface wider than the conductive wire of the winding portion 44 by crushing a portion closer to the tip portions of the extended portions 40 and 42 rather than portions arranged close to the notches 14 and 15 of the base portion 10 of the magnetic base 8.

The pair of extended portions 40 and 42 of the coil 54 is extended from one side surface of the base portion 10 of the magnetic base 8. At this time, each of the pair of extended portions 40 and 42 is twisted toward the center portion of the base portion 10 of the magnetic base 8, and is extended to the lower surface 10*b* side of the base portion 10 so that one wide surface 66 comes into contact with the inner side surfaces of the notches 14 and 15. The tip portions 40*a* and 42*a* of the extended portions 40 and 42 extended to the lower surface 10*b* side are bent and arranged on the lower surface 10*b* of the magnetic base 8.

(3) Step of Molding and Curing

The magnetic base 8 to which the coil 54 obtained in the above-described step is attached is accommodated in a cavity of a mold having a convex portion on a bottom surface of the cavity in a state in which the lower surface 10*b* of the base portion 10 faces the bottom surface of the cavity, and brings the lower surface 10*b* of the base portion 10 into contact with the bottom surface of the cavity of the mold. Next, the cavity is filled with a mixture of magnetic powder and resin. Further, the mixture of the magnetic powder and the resin is pressurized at about 100 kg/cm$^2$ to 500 kg/cm$^2$ in a state of being heated to a temperature (for example, 60° C. to 150° C.) equal to or higher than the softening temperature of the resin in the mold, and is heated to a temperature (for example, 100° C. to 220° C.) equal to or higher than the curing temperature of the resin to be molded and cured. Thus, the magnetic outer coating 6, the coil 54, and the magnetic base 8 are integrated to form the body 2. Note that the curing may be performed after the molding. By this molding and curing, the magnetic base 8 and the coil 54 wound around the columnar portion 16 of the magnetic base 8 are incorporated, and the recessed portion 12 (standoff) is formed on the mounting surface (the lower surface 10*b* of the base portion 10).

In addition, when the magnetic powder-resin mixture filled in the mold is pressurized, molded, and cured, the magnetic powder-resin mixture is pressurized at about 100 kg/cm$^2$ to 500 kg/cm$^2$ in a state of being heated to a temperature (for example, 60° C. to 150° C.) equal to or higher than the softening temperatures of both the resin and the fusion layer of the conductive wire in the mold, and molded and cured by applying a temperature (for example, 100° C. to 220° C.) equal to or higher than the curing temperature of the resin, whereby the conductive wire of the upper stage portion 46 and the conductive wire of the lower stage portion 48 of the winding portion 44 of the coil 54 are formed in a nested manner with each other. The region in which the conductive wire of the upper stage portion 46 and the conductive wire of the lower stage portion 48 are formed in a nested manner may be formed not over the entire periphery of the winding portion 44 but in a part thereof. At this time, a portion in which an upper portion of the conductive wire is inclined in a direction away from the winding axis B2 is formed in the conductive wire of the upper stage portion 46 of the winding portion 44 due to the pressure in molding. As a result, the protruding portion 50 and the straight portion 52 are formed in a part of the upper stage portion 46. In addition, the columnar portion 16 of the magnetic base 8 with which the inner periphery of the winding portion 44 is in contact is thicker at the tip than at the root portion, and the protruding surface 22 and the planar surface 24 are formed on the side surface.

(4) Step of Forming Exterior Resin on Body

In this step, the exterior resin is formed on the entire surface of the obtained body 2. The exterior resin is formed by applying a thermosetting resin such as an epoxy resin, a polyimide resin, or a phenol resin or a thermoplastic resin such as a polyethylene resin or a polyamide resin to the surface and curing the resin.

(5) Step of Removing Exterior Resin and Coating Layer and Fusion Layer of Conductive Wire In the body 2 on which the exterior resin is formed, the exterior resins and the coating layer and the fusion layer of the conductive wire at positions where the external terminals 4*a* and 4*b* are formed are removed. The exterior resin and the coating layer and the fusion layer of the conductive wire are removed by physical means such as laser, blast treatment, or polishing.

(6) Step of Forming External Terminal

In positions of the mounting surface of the body 2 at which the external terminals 4*a* and 4*b* are formed, resin containing silver powder is applied so as to cover the tip portions 40*a* and 42*a* of the extended portions 40 and 42 of the coil 54. At this time, the resin containing silver powder may be applied so that both end regions of the tip portions 40*a* and 42*a* of the extended portions 40 and 42 of the coil 54 are covered and the central regions 40*b* and 42*b* are exposed.

The body 2 is plated, and the external terminals 4*a* and 4*b* are formed in portions of the body 2 from which the exterior resin is removed. The external terminals 4*a* and 4*b* are formed by plating and growth on the metal magnetic powder exposed to the surface of the body 2 and on the resin containing silver powder. Further, in the case where the resin containing silver powder is applied so as to cover both the end regions of the tip portions 40*a* and 42*a* of the extended portions 40 and 42 of the coil 54 and expose the central regions 40*b* and 42*b*, the external terminals 4*a* and 4*b* are formed by plating and growth on the metal magnetic powder exposed to the surface of the body 2, on the resin containing silver powder, and on the central regions 40*b* and 42*b* of the tip portions 40*a* and 42*a* of the extended portions 40 and 42 of the coil 54. In the plating and growth, for example, a nickel layer made of nickel is formed, and then a tin layer made of tin is formed on the nickel layer.

Modified Example

The inductor 1 described above includes the coil 54, the magnetic base 8, the magnetic outer coating 6, and the external terminals 4*a* and 4*b*, but is not limited thereto. The inductor according to the present disclosure may include the coil 54, the magnetic outer coating 6, and the external terminals 4*a* and 4*b* without including the magnetic base 8, for example.

Furthermore, the shape of the coil 54 of the inductor 1 described above is an elongated annular shape in a plan view, but is not limited thereto. The planar shape of the coil 54 may be, for example, an elliptical ring shape, a perfect circular ring shape, a substantially rectangular ring shape with curved corners, or the like.

Although the embodiment and the examples of the present disclosure have been described above, the disclosed content may be changed in details of the configuration, and a combination of elements, a change in order in the embodiment and examples, or the like may be realized without departing from the scope and spirit of the present disclosure as claimed.

What is claimed is:

1. An inductor comprising:

a coil including a winding portion and a pair of extended portions extended from the winding portion; and a body in which the coil is embedded and which contains a magnetic powder containing a first magnetic powder and a second magnetic powder, wherein the body includes a magnetic base and a magnetic outer coating on the magnetic base, wherein an average particle diameter of the first magnetic powder is larger than an average particle diameter of the second magnetic powder, a cross section of the body including a winding axis of the winding portion and extending in a long side direction of the body is divided by Voronoi partition with a center of gravity of each magnetic powder as a generating point, and when a standard deviation of an area of a Voronoi partition region with a magnetic powder having a particle diameter of equal to or more than 6 μm as a generating point is calculated, the standard deviation is equal to or less than 300, and the standard deviation in the magnetic base is smaller than the standard deviation in the magnetic outer coating.

2. The inductor according to claim 1, wherein a filling rate of a magnetic powder of the body is equal to or more than 77%.

3. The inductor according to claim 1, wherein the standard deviation is from 230 to 300.

4. The inductor according to claim 1, wherein the standard deviation is from 190 to 290.

5. The inductor according to claim 1, wherein the winding portion is wound in the magnetic base, the magnetic base contains the magnetic powder, and the magnetic outer coating covers a part of the magnetic base, a part of the pair of extended portions, and the winding portion and containing the magnetic powder.

6. The inductor according to claim 5, wherein a filling rate of a magnetic powder of the magnetic base is equal to or more than 80%.

7. The inductor according to claim 5, wherein a filling rate of a magnetic powder of the magnetic base is from 80% to 85%.

8. The inductor according to claim 5, wherein a filling rate of a magnetic powder of the magnetic outer coating is equal to or more than 77%.

9. The inductor according to claim 5, wherein a filling rate of a magnetic powder of the magnetic outer coating is from 77% to 85%.

10. The inductor according to claim 1, wherein the average particle diameter of the first magnetic powder is from 16 μm to 23 μm.

11. The inductor according to claim 1, wherein the average particle diameter of the second magnetic powder is from 1.9 μm to 3.5 μm.

12. The inductor according to claim 2, wherein the standard deviation is from 230 to 300.

13. The inductor according to claim 2, wherein the standard deviation is from 190 to 290.

14. The inductor according to claim 1, wherein a filling rate of a magnetic powder of the magnetic base is equal to or more than 80%.

15. The inductor according to claim 1, wherein a filling rate of a magnetic powder of the magnetic base is from 80% to 85%.

16. The inductor according to claim 1, wherein a filling rate of a magnetic powder of the magnetic outer coating is equal to or more than 77%.

17. The inductor according to claim 1, wherein a filling rate of a magnetic powder of the magnetic outer coating is from 77% to 85%.

18. The inductor according to claim 2, wherein the average particle diameter of the first magnetic powder is from 16 μm to 23 μm.

19. The inductor according to claim 2, wherein the average particle diameter of the second magnetic powder is from 1.9 μm to 3.5 μm.

20. The inductor according to claim 1, wherein the standard deviation inside of the coil is smaller than the standard deviation outside of the coil.

* * * * *